United States Patent
Kondo et al.

(10) Patent No.: US 7,985,279 B2
(45) Date of Patent: Jul. 26, 2011

(54) GAS SEPARATOR AND OPERATING METHOD FOR THE SAME

(75) Inventors: Takahiko Kondo, Yokohama (JP);
Takuya Hasegawa, Yokohama (JP);
Naohiro Morimoto, Fujisawa (JP);
Hidetoshi Masugi, Yokohama (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 913 days.

(21) Appl. No.: 11/579,822

(22) PCT Filed: May 16, 2005

(86) PCT No.: PCT/JP2005/008892
§ 371 (c)(1),
(2), (4) Date: Jul. 2, 2007

(87) PCT Pub. No.: WO2005/110581
PCT Pub. Date: Nov. 24, 2005

(65) Prior Publication Data
US 2007/0287036 A1 Dec. 13, 2007

(30) Foreign Application Priority Data

May 18, 2004 (JP) .................. 2004-147213
Jan. 11, 2005 (JP) .................. 2005-004027
Jan. 11, 2005 (JP) .................. 2005-004028

(51) Int. Cl.
*B01D 53/22* (2006.01)

(52) U.S. Cl. .............. 95/45; 95/52; 96/4; 96/7; 96/11; 96/12; 429/413

(58) Field of Classification Search .................... 96/4, 7, 96/11, 12; 95/45, 52; 210/640; 261/100, 261/102, 104; 429/12, 13, 34, 413, 414; 55/521
See application file for complete search history.

(56) References Cited

U.S. PATENT DOCUMENTS 3,903,694 A * 9/1975 Aine .................. 96/12
(Continued)

FOREIGN PATENT DOCUMENTS

| JP | 63-175618 | * | 7/1988 |
| JP | 1-107826 | | 4/1989 |
| JP | 8-273687 | | 10/1996 |
| JP | 11-294806 | | 10/1999 |
| JP | 11-354142 | | 12/1999 |

(Continued)

OTHER PUBLICATIONS

International Search Report dated Jul. 26, 2005 of International application PCT/JP2005/008892.

*Primary Examiner* — Jason M Greene
(74) *Attorney, Agent, or Firm* — Staas & Halsey LLP

(57) ABSTRACT

A gas separator having excellent humidifying performance, pressure loss, volume efficiency, and durability humidifies gases used in an on-vehicle fuel cell. The gas separator has upper and lower surfaces of pleat elements of a pleat molding covered by a plate having intake and exhaust ports. The pleat molding is formed by pleating a compound membrane formed of a gas separating membrane and at least one layer of permeable reinforcement material. The pleat element is formed by disposing a reinforcement frame at the outer side part of the molding. The ratio (R=L/H) of a shortest distance (L) between the intake and exhaust ports to a height (H) of the pleat molding is 0.1 to 7.0, and the ratio (W/Le) of the width (W) to the length (Le) of the pleat molding is 0.3 to 10.0. The gas separator operates at a volume flow ratio of 200 or higher.

14 Claims, 12 Drawing Sheets

U.S. PATENT DOCUMENTS

| | | | |
|---|---|---|---|
| 4,040,804 A | 8/1977 | Harrison | |
| 7,332,017 B2 * | 2/2008 | Jain | 95/52 |
| 2003/0051451 A1 * | 3/2003 | Kusunose et al. | 55/320 |
| 2005/0252982 A1 * | 11/2005 | Akita et al. | 236/44 A |
| 2008/0085437 A1 * | 4/2008 | Dean et al. | 261/104 |
| 2008/0241606 A1 * | 10/2008 | Gallagher | 429/13 |

FOREIGN PATENT DOCUMENTS

| | | |
|---|---|---|
| JP | 2002-252012 | 9/2002 |
| JP | 2002-298884 | 10/2002 |
| JP | 2002-313378 * | 10/2002 |
| JP | 2002-346332 | 12/2002 |
| WO | WO 2004/107490 A1 * | 12/2004 |

* cited by examiner

GAS SEPARATOR AND OPERATING METHOD FOR THE SAME

This application is based of PCT Application No. PCT/JP2005/008892 filed May 16, 2005 and Japanese Application Nos. 2004-147213, 2005-004027 and 2005-004028, filed May 18, 2004, Jan. 11, 2005 and Jan. 11, 2005 respectively in Japan, the disclosures of which are hereby incorporated herein by reference.

TECHNICAL FIELD

The present invention relates to a gas separator, and more particularly, to a humidifier suitable for humidifying various gases for use in a fuel cell, and an operating method thereof.

BACKGROUND ART

Membrane separation has been widely put into practical use in liquid treatment such as concentration of a solution and water purification due to advantages that it can be performed with a relatively simple apparatus at low operation cost as compared with another separation method (such as distillation and absorption). On the other hand, a gas treatment through membrane separation has partially become commercially practical in recovery of hydrogen in an ammonia plant, recovery of volatile organic compounds (VOC) from a gasoline oil tank, and an air-conditioner oxygen enrichment apparatus, but its treatment capability is not sufficient as compared with the liquid treatment. Therefore, it has not provided a major industry at present. The treatment capability in this case includes not only gas permeability (membrane performance) per unit area of a membrane but also gas permeability (apparatus performance) per unit volume, pressure loss inside the apparatus, life of a gas separation membrane (chemical deterioration and physical breakage), manufacture cost, and operation cost. The present inventors have selected air humidification with exhaust gas in a fuel cell as a specific means for solving the problem and studied new gas treatment with membrane treatment.

The fuel cell is a type of electric power generator which takes electric energy by electrochemically oxidizing fuel such as hydrogen and methanol, and has drawn attention as a clean energy source in recent years. The fuel cell is classified in terms of the type of electrolyte used therefor into a phosphoric acid type, a fused carbonate type, a solid oxide type, a solid polyelectrolyte type and the like. Since the fuel cell of the solid polyelectrolyte type typically operates at a low temperature of 100° C. or lower and provides high energy density, it is expected to fine wide application as a power source of electric cars and the like.

The basic structure of the fuel cell of the solid polyelectrolyte type is formed of an ion-exchange membrane and a pair of gas diffusion electrodes bonded to both surfaces thereof. Hydrogen is supplied to one of the electrodes and oxygen is supplied to the other. Both electrodes are connected to an external load circuit to generate power. More specifically, protons and electrons are produced on the electrode supplied with hydrogen, and the protons move through the ion-exchange membrane and then reach the electrode supplied with oxygen where they react with the oxygen to form water. On the other hand, the electrons move out along wire from the electrode supplied with hydrogen to the external lode circuit where their electric energy is taken out. Then, the electrons reach the electrode supplied with oxygen along the wire and contribute to the proceeding of the reaction to form water.

Fluorine ion-exchange resin is widely used due to its high chemical stability as a material of the ion-exchange membrane for use in the fuel cell of the solid polyelectrolyte type. Among others, Nafion® manufactured by DuPont Japan, having perfluorocarbon at a principal chain and a sulfonic acid group at the end of a side chain, is widely used. As well known by those skilled in the art, it is necessary that such fluorine ion-exchange resin is sufficiently swelled with water in order to exert high ion conduction. Thus, ensuring sufficient water supply is a significant problem in use for a mobile body with limited water supply, particularly in an on-vehicle fuel cell.

As described before, the fuel cell forms water on the electrode supplied with oxygen through the reaction. If water vapor contained in exhaust air on the oxygen side can be used to humidify the intake air on the oxygen side or hydrogen side, water can be provided therein without additionally using any water tank or the like. In the present invention, "a humidifier" refers to a "gas separator" having the capability of allowing water vapor on one side of a "water vapor permeating membrane" to preferentially pass through the water vapor permeating membrane, which is a "gas separating membrane" having the property of preferentially transmitting water vapor gas rather than oxygen gas or nitrogen gas, to humidify gas on the other side of the water vapor permeating membrane.

The humidifier for an on-vehicle fuel cell needs to have the following characteristics:

(1) humidification performance; sufficient humidifying amount necessary for operation of a fuel cell, (2) pressure loss; low pressure loss with no load on a compressor, (3) volume efficiency; high volume efficiency for realizing a compact volume, and (4) durability; various types of performance maintained under use for a long time period.

Prior arts of the humidifier include, for example, Patent Document 1 which has disclosed a humidifier including a plurality of semi-permeating membranes (water vapor permeating membranes) stacked in the same direction as the direction in which fuel cells are placed. According to the disclosure, intake air can be humidified on the oxygen side or hydrogen side. However, in order to ensure the necessary area of the membranes for sufficient humidification a considerable number of stacked semi-permeating membranes are required. As a result, the seals of the semi-permeating membranes are increased according to the number of membranes to result in higher cost, and the number of gas passes (separators) is increased according to the number of membranes to cause low volume efficiency.

Patent Document 2 has disclosed a humidifier characterized that a water vapor permeating membrane is made of hollow fiber. According to the disclosure, the use of the hollow fiber eliminates the need for the separators used in Patent Document 1 to improve volume efficiency. However, uneven distribution of hollow fiber or the like easily produces a non-uniform flow of gas, so that sufficient humidification performance may not be provided. In addition, since the hollow fiber is exposed to fast air flows on the inside and outside, the hollow fiber flutters due to self oscillation and external oscillation to easily wear or break the hollow fiber or strain fixing portions at both ends of the hollow fiber to easily cause the breakage thereof.

Patent Document 3 has disclosed a humidifier including a cylindrical pleated structure formed by pleating and rolling a sheet-shaped water vapor permeating membrane into a cylindrical form, hermetically sealing the joints, and hermetically sealing the both ends of the cylindrical pleated membrane with a doughnut-shaped end plate. According to the disclosure, the flat membrane formed into the pleated shape can avoid the problems of cost and volume efficiency as in Patent Document 1 and the problem of physical durability as in Patent Document 2. However, the cylindrical pleated structure described in FIG. 3 and paragraph 0030 of the specification of Patent Document 3 has the problem of low volume efficiency since it typically has dead space corresponding to the inner diameter which is approximately half the outer diameter.

A humidifier with low volume efficiency can improve humidification performance by increasing the area of membrane. However, as readily imagined, the increased area of membrane causes higher air-flow resistance, which presents the problem that the higher pushing-pressure is required in order to maintain a predetermined flow rate, i.e. the problem that pressure loss in the humidifier increases.

Patent Document 1: JP-A-11-354142
Patent Document 2: JP-A-08-273687
Patent Document 3: JP-A-2002-252012

DISCLOSURE OF INVENTION

Problems to be Solved by the Invention

It is an object of the present invention to provide a gas separator excellent in use efficiency of a gas separation membrane, pressure loss and durability, and an operating method thereof, particularly, a humidifier suitable for use in a solid polyelectrolyte type fuel cell and an operating method thereof.

Means for Solving the Problems

As a result of the studies for solving the abovementioned problems, the present inventors have found that a specific form factor of a gas separator is closely associated with use efficiency of a gas separation membrane and pressure loss and that a specific operating condition of the gas separator is closely associated with the use efficiency of the gas separation membrane and pressure loss, and thus has achieved the present invention.

Specifically, the present invention provides:

1. A gas separator comprising a pleat element including a pleat molding and a reinforcement frame, the pleat molding being formed by pleating a composite membrane formed of a gas separation membrane and at least one layer of breathable reinforcement material, the reinforcement frame being placed on the outer periphery of the pleat molding, and an upper surface and a lower surface of the pleat element being covered with a plate having at least one set of an intake port and an exhaust port, wherein a ratio (R=L/H) of the shortest length (L) between the intake port and the exhaust port to a height (H) of the pleat element ranges from 0.1 to 7.0, and a ratio (W/Le) of a length (Le) to a width (W) of the pleat element ranges from 0.3 to 10.0;

2. The gas separator according to 1, wherein the gas separation membrane is a water vapor permeating membrane.

3. The gas separator according to 1, wherein the gas separator has a humidifying function.

4. The gas separator according to any one of 1 to 3, further comprising a pressure absorber between an external pipe and the intake port and the exhaust port.

5. The gas separator according to any one of 1 to 4, wherein all of intake ports, exhaust ports, and pressure absorbers are integrally formed.

6. The gas separator according to any one of 1 to 5, wherein the reinforcement frame is formed of a seal material.

7. The gas separator according to any one of 1 to 6, wherein at least one pleat element is placed in two pressure plates, and the reinforcement frame of each pleat element and the two pressure plates are in close contact with each other to form one hermetic space.

8. A method of operating the gas separator according to any one of 1 to 7, wherein the gas separator operates at a ratio (a volume rate of flow=NL/Ve) of gas flow rate (NL) per unit time to an outer volume (Ve) of the pleat element of 200 or higher.

Effects of the Invention

According to the present invention, a gas separator excellent in use efficiency of a gas separation membrane, pressure loss, and durability, and an operating method thereof are provided. More particularly, a humidifier suitable for use in a solid polyelectrolyte type fuel cell and an operating method thereof are provided.

BRIEF DESCRIPTION OF THE DRAWINGS

FIG. 3 is a schematic diagram showing an example of a flat type pleat element bonded with an adhesive or the like;

FIG. 10a is a perspective view showing the outer appearance of a humidifier of the present invention and FIG. 10b is an exploded view showing the humidifier;

DESCRIPTION OF REFERENCE NUMERALS

Figure 1:
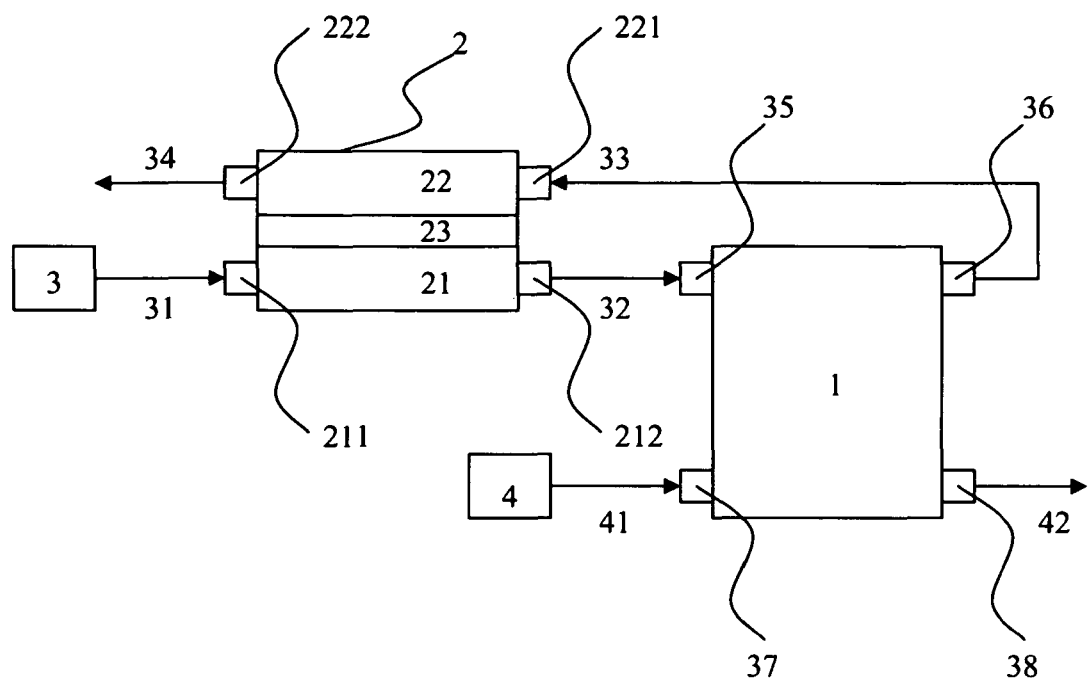
FIG. 1 shows the structure of a fuel cell system illustrating an example of an embodiment of the present invention.

1 FUEL CELL
2 HUMIDIFIER
3 COMPRESSOR
4 HYDROGEN SUPPLY SOURCE
5 REINFORCEMENT FRAME
6 PLEAT ELEMENT

7 SEAL MATERIAL
8 HOUSING
21 DRY-SIDE FLOW PASS
22 WET-SIDE FLOW PASS
23 PLEAT MOLDING SERVING AS GAS SEPARATION MEMBRANE BASE MATERIAL
23A GAS SEPARATION MEMBRANE
23B BREATHABLE REINFORCEMENT MATERIAL
31, 32, 33, 34, 41, 42 PIPING
35 INTAKE PORT ON CATHODE SIDE
36 EXHAUST PORT ON CATHODE SIDE
37 INTAKE PORT ON ANODE SIDE
38 EXHAUST PORT ON ANODE SIDE
51 ADHESIVE
52 REINFORCEMENT FRAME
61 WIDTH (w) OF INTAKE PORT AND EXHAUST PORT
62 LENGTH (Le) OF INTAKE PORT AND EXHAUST PORT
63 INTERVAL OF INTAKE PORT AND EXHAUST PORT
70 FLOW PASS FORMING MEANS
91, 92 OPENING A
93 OPPOSITE SURFACE
211, 221 INTAKE PORT
212, 222 EXHAUST PORT

BEST MODE FOR CARRYING OUT THE INVENTION

[Definition of Components]

"Pleating" in the present invention refers to working for providing a gas separation membrane base material with a cross-sectional shape such as V shape, U shape, and Ω shape. As compared with the case where such working is not performed, a wider area of membrane can be included in the same projection area and the same volume.

The "gas separation membrane base material" in the present invention refers to a basic constituent member of an element formed of a gas separation membrane and at least one layer of breathable reinforcement material, and can be formed as a laminator of the gas separation membrane and the breathable reinforcement material as required. A "humidifying membrane base material" refers to a basic constituent member formed of a water vapor permeating membrane and at least one layer of breathable reinforcement material, and can be formed as a laminator of the water vapor permeating membrane and the breathable reinforcement material as required.

The "gas separation membrane" in the present invention refers to a type of selective permeating membrane having the property of preferentially transmitting a specific gas from a mixture of gasses and includes a membrane which transmits a specific gas only at a particular partial pressure. The "water vapor permeating membrane" is an example of the gas separation membrane and refers to a type of selective permeating membrane having the property of preferentially transmitting water vapor from a mixture of gasses containing water vapor and includes a membrane (a porous humidifying membrane, later described) which exerts selective permeability only under the presence of water vapor in predetermined conditions. Particularly, the property of preventing transmission of any gas other than water vapor may be referred to as an anti-leak property. The present invention is characterized by using a "flat membrane" which can be pleated, as the gas separation membrane.

The "breathable reinforcement material" in the present invention contributes to a means for achieving favorable membrane use efficiency by preventing close contact between adjacent gas separation membranes inside the pleats, and has supplemental functions for providing the independency necessary for a pleat molding.

The "pleat molding" in the present invention refers to a structure provided by pleating the flat-shaped gas separation membrane basic material.

A "reinforcement frame" in the present invention refers to a structure for forming a pleat element by hermetical bonding to the surroundings of the pleat molding. Specifically, the reinforcement frame has the function of integrating with the end face of the pleat molding to hermetically separate the upper surface from the lower surface of the pleat element. Various materials can be used such as resin, metal, and ERP (fiber reinforced plastic) in accordance with the object.

The "pleat element" in the present invention refers to a unit formed of the pleat molding and the reinforcement frame.

A "housing" in the present invention refers to a supplemental means for providing the pleat element with functions other than the gas separating function (such as a function of protection from mechanism breakage and a function of connection with an external circuit). In many cases, the pleat element is placed in or connected to the housing to provide additional functions necessary for practical use to form a "gas separator."

In the present invention, the "length" of the pleats refers to a dimension or a distance in the direction in parallel with the pleats. The "width" of the pleat refers to a dimension or a distance in the direction perpendicular to the pleats.

An embodiment of the present invention will hereinafter be described with reference to the drawings.

[Fuel Cell System]

FIG. 1 shows the structure of a fuel cell system illustrating an exemplary embodiment of the present invention (the housing is not explicitly shown). The fuel cell uses air as a source of hydrogen and oxygen.

A humidifier 2 comprises a dry-side flow pass 21 through which air is introduced, a wet-side flow path 22 through which cathode-side exhaust air is introduced from a fuel cell 1, intake ports 211 and 221, exhaust ports 212 and 222, and a humidifying membrane base material 23 for separating these flow passes. The intake port 211 of the dry-side flow pass 21 of the humidifier 2 is connected to a compressor 3 serving as an air supply source through piping 31. The exhaust port 212 of the dry-side flow pass 21 is connected to an intake port 35 of the fuel cell 1 on the cathode side through piping 32. The intake port 221 of the wet-side flow pass 22 is connected to an exhaust port 36 of the fuel cell 1 on the cathode side through piping 33. The exhaust port 222 of the wet-side flow pass 22 is connected to piping 34 for exhaust. A hydrogen supply source 4 is connected to an intake port 37 of the fuel cell 1 on the anode side through piping 41. An exhaust port 38 of the fuel cell 1 on the anode side is connected to piping 42 for exhaust.

The exhaust air from the cathode side of the fuel cell 1 is a mixture of gasses formed of water produced through battery reaction, water supplied from the humidifier 2 and not absorbed in the fuel cell 1, oxygen supplied from humidifier 2 and not used in the battery reaction, and air constituent gas such as nitrogen other than oxygen. The mixture of gasses is introduced from piping 33 into the wet-side flow pass 22 of the humidifier 2. Since the humidifier membrane base material 23 passes only water vapor, the water vapor within the wet-side flow pass 22 is moved to the dry-side flow pass 21 to humidify the air within the dry-side flow pass 21. The humidified air is introduced to the intake port 35 of the fuel cell 1 on the cathode side through the piping 32. In this manner, the humidifier 2 for humidification can stably achieve humidification necessary for the operation of the fuel cell without changing the composition of any gas other than water vapor or pressure. Thus, the humidifier according to the present invention is suitable particularly for mounting on a fuel-cell vehicle.

Since the dry-side flow pass is pressured by the compressor 3, the total pressure therein is higher than that in the wet-side flow pass. For this reason, the water vapor permeating membrane needs to have not only the abovementioned water vapor permeability but also the anti-leak property sufficient for the difference in total pressure, that is, the non-permeability for the other gasses including air.

[Water Vapor Permeating Membrane]

The water vapor permeability of the water vapor permeating membrane can be evaluated in various manners. For example, it can be evaluated by moisture permeability with a calcium chloride method described in JIS-L-1099.

The non-permeability for the other gasses including air of the water vapor permeating membrane can be evaluated in various manners. For example, it can be evaluated by air permeability described in JIS-P-8117. When the humidifier is used for fuel cells, heat resistance is preferably provided as well as the abovementioned properties.

The water vapor permeating membrane is classified into a porous water vapor permeating membrane, homogenous water vapor permeating membrane, and a composite water vapor permeating membrane.

The water vapor permeating membrane preferably has a moisture permeability of 1000 to 30000 ($g/m^2 \cdot 24$ hr), more preferably 2000 to 20000 ($g/m^2 \cdot 24$ hr), and more preferably 5000 to 15000 ($g/m^2 \cdot 24$ hr).

The water vapor permeating membrane preferably has an air permeability of 500 seconds or higher, more preferably 1000 seconds or higher, more preferably 10000 seconds or higher, more preferably 100000 seconds or higher, and more preferably 1000000 seconds or higher. Since the porous water vapor permeating membrane, later described, exerts non-permeability only in wet conditions, the air permeability is not used as a measure of the non-permeability.

The water vapor permeating membrane preferably has a thickness of 1 to 1000 µm. The lower limit of the thickness is preferably no less than 5 µm, more preferably no less than 10 µm, and most preferably no less than 20 µm. The upper limit of the thickness is preferably no more than 500 µm, more preferably no more than 300 µm, and most preferably no more than 200 µm. A thickness less than 1 µm may not provide sufficient mechanism strength. A thickness of more than 1000 µm may reduce the water vapor permeability.

[Porous Water Vapor Permeating Membrane]

As the porous water vapor permeating membrane, a woven fabric, a nonwoven fabric, or a microporous membrane can be used. As well known by those skilled in the art, when gas containing water vapor comes into contact with a porous water vapor permeating membrane having pores of a diameter of 10 µm or less, so-called "Kelvin condensation" occurs in which water vapor is condensed in the micropores of the porous water vapor permeating membrane to form a type of liquid film to exert the anti-leak property. The liquid film is made of water and thus has high water vapor permeability, so that water vapor can transmit through it as fast as water on a free surface can.

The porous water vapor permeating membrane preferably has pores having a diameter of 0.001 µm to 10 µm. The lower limit of the diameter is preferably no less than 0.005 µm, and more preferably no less than 0.01 µm. The upper limit of the diameter is preferably no more than 5 µm, more particularly no more than 1 µm, more preferably no more than 0.5 µm, more particularly no more than 0.2 µm, and most preferably no more than 0.1 µm. A diameter less than 0.001 µm may not provide sufficient water vapor permeability. A diameter of more than 10 µm may make it difficult to cause Kelvin condensation.

The porous water vapor permeating membrane preferably has a porosity of 5 to 90%. The lower limit of the porosity is preferably no less than 10%, more preferably no less than 20%, more preferably no less than 30%, and most preferably no less than 40%. A porosity of less than 5% may not provide sufficient water vapor permeability. A porosity of more than 90% may not realize sufficient mechanical strength.

[Homogenous Water Vapor Permeating Membrane]

A homogenous membrane made of water vapor permeating material is referred to as a homogenous water vapor permeating membrane.

Applicable water vapor permeating materials include a nonelectrolyte polymer such as polyethylene oxide, polyvinyl alcohol, cellulose ether, and starch, and a copolymer thereof; an electrolyte polymer such as polyacrylic acid, polyacrylic amide, polyisopropyl acryl amide, polystyrene sulfonic acid, polyvinyl pyridine, and polyamino acid, a copolymer thereof, and a chloride thereof; and any other known material including water absorbing or water containing resin such as fluorine ion exchange resin as described above. Cross-linking such as ion cross-linking, chemical cross-linking, and radiation cross-linking and reinforcement such as fiber reinforcement and fibril reinforcement can be performed as required to adjust a water content or make it insoluble in water.

The water vapor permeating material preferably has a water content of 5 to 95%. The lower limit of the water content of the homogenous porous membrane is preferably no less than 20%, more preferably 40%, more preferably no less than 60%, and most preferably no less than 80%. The upper limit of the water content is more preferably no more than 90%. A water content of less than 5% may make it difficult to provide sufficient humidification capability. A water content of more than 95% may cause the problems of significant volume shrinkage during drying, low mechanical strength or the like.

[Composite Water Vapor Permeating Membrane]

A composite membrane provided by applying or impregnating the water vapor permeating material to the porous base material such as a woven fabric, nonwoven fabric, and microporous membrane is referred to as a composite water vapor permeating membrane.

Usable water vapor permeating materials include a nonelectrolyte polymer such as polyethylene oxide, polyvinyl alcohol, cellulose ether, and starch, and a copolymer thereof; an electrolyte high polymer such as polyacrylic acid, polyacrylic amide, polyisopropyl acryl amide, polystyrene sulfonic acid, polyvinyl pyridine, and polyamino acid, a copolymer thereof, and a chloride thereof; and any other known material including water absorbing or water containing resin such as fluorine ion exchange resin as described above. Cross-linking such as ion cross-linking, chemical cross-linking, and radiation cross-linking and reinforcement such as fiber reinforcement and fibril reinforcement can be performed as required to adjust water content or make it insoluble in water.

The water vapor permeating material preferably has a water content of 5 to 95%. The lower limit of the water content is preferably no less than 20%, more preferably no less than 40%, more preferably no less than 60%, and most preferably no less than 80%. The upper limit of the water content is more preferably no more than 90%. A water content of less than 5% may make it difficult to provide sufficient humidification capability. A water content of more than 95% may cause the problems of significant volume shrinkage during drying, low mechanical strength and the like.

The porous base material preferably has a porosity of 5 to 90%. The lower limit of the porosity is preferably no less than 10%, more preferably no less than 20%, more preferably no less than 30%, and most preferably no less than 40%. A porosity of less than 5% may not provide sufficient water vapor permeability. A porosity of more than 95% may not realize sufficient mechanical strength.

[Breathable Reinforcement Material]

The breathable reinforcement material is a mesh or porous sheet and can be put on the gas separation membrane to maintain the pleat pitch to favorably introduce gas into the depth of the pleats. Although the gas separation membrane typically has insufficient stiffness, it can be put on the breathable reinforcement material to improve the independency and structure strength of the pleat molding, particularly the buckling strength.

The breathable reinforcement material can be provided on both surfaces or one surface of the gas separation membrane. Particularly, when a pressure difference is present across the gas separation membrane, the breathable reinforcement material is preferably provided at least for the low-pressure side.

As the breathable reinforcement material, a woven fabric, a nonwoven fabric, a resin net (for example, made of polypropylene, polyester, and nylon), or a metal net can be used. Of them, the resin net and the metal net are preferable.

The breathable reinforcement material preferably has a thickness of 10 to 5000 μm. The lower limit of the thickness is preferably no less than 100 μm, more preferably no less than 200 μm, and most preferably no less than 500 μm. The upper limit of the thickness is preferably no more than 3000 μm, more preferably no more than 2000 μm, and most preferably no more than 1000 μm. A thickness of less than 10 μm may not provide sufficient mechanical strength. A thickness of more than 5000 μm may reduce gas permeability. The thickness of the breathable reinforcement material is measured with the method described in JIS-L-1096.

The breathable reinforcement material preferably has a porosity of 30 to 95%. The lower limit of the porosity is preferably no less than 40%, more preferably no less than 50%, more preferably no less than 60%, and most preferably no less than 70%. A porosity of less than 30% may not provide sufficient gas separation. A porosity of more than 95% may not provide sufficient mechanical strength.

The breathable reinforcement material preferably has an air permeability of 100 seconds or less, more preferably 10 seconds or less, and most preferably 1 second or less.

When a net is used, the number of meshes thereof is preferably 2 to 1000. The lower limit of the mesh number is more preferably no less than 3, more preferably no less than 5, more preferably no less than 10, and particularly preferably no less than 12. The upper limit of the mesh number is preferably no more than 100, more preferably no more than 50, more preferably no more than 30, and particularly preferably no more than 20.

The wire diameter when a net is used is preferably 0.01 to 2 mm. The lower limit of the wire diameter is preferably no less than 0.02 mm, more preferably no less than 0.04 mm, more preferably no less than 0.06 mm, particularly preferably no less than 0.08 mm. The upper limit of the wire diameter is preferably no more than 1 mm, more preferably no more than 0.6 mm, more preferably no more than 0.4 mm, and particularly preferably no more than 0.2 mm.

When a net with a mesh number of 100 or less is used, a thin breathable reinforcement material is preferably provided between the gas separation membrane and the breathable reinforcement material in order to protect the gas separation membrane. The breathable reinforcement material preferably has one surface or both surfaces smoothed as the breathable reinforcement material of this type.

[Pleat Molding]

The pleat molding is provided by pleating the flat gas separation membrane base material. Typically, the pleating is performed on the laminate formed of the gas separation membrane and the breathable reinforcement material. When needed, the pleating may be performed only on the gas separation membrane and then the breathable reinforcement material may be inserted into between the pleats.

Figure 2:
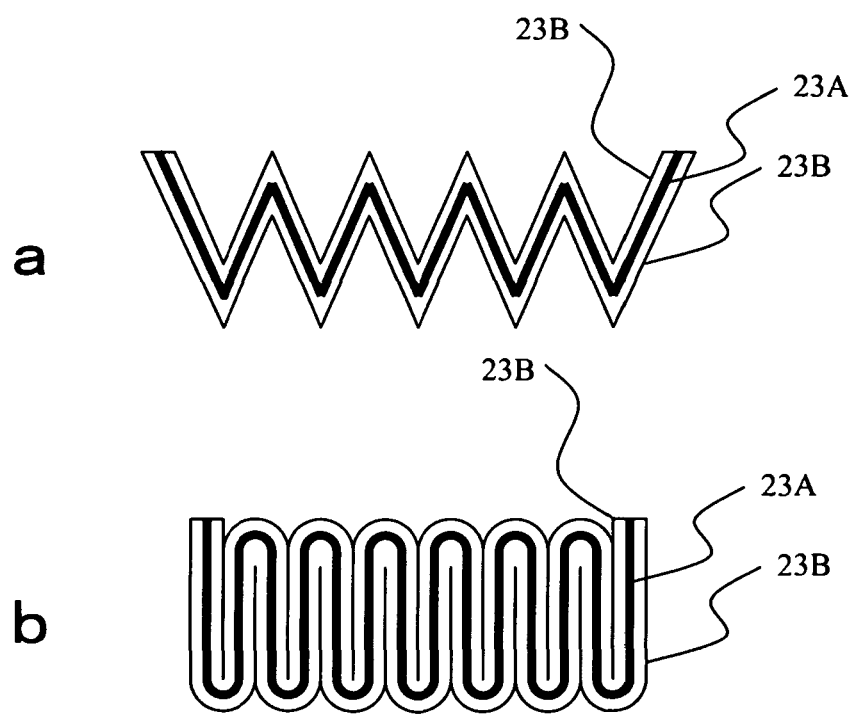
FIGS. 2a and 2b are schematic diagrams showing an example of a pleat molding of the present invention.

FIGS. 2a and 2b are schematic diagrams showing an example of the pleat molding according to the present invention. FIGS. 2a and 2b show the pleat molding provided by pleating the gas separation membrane base material formed of a gas separation membrane 23A and a breathable reinforcement material 23B.

A known method can be used in the pleating, for example a reciprocating (accordion) pleat machine or a rotary pleat machine can be used.

A height H of the pleats refers to the height from a peak to a peak of the pleat molding. If the height H is uneven, the average of the heights can be used as H. The height H is preferably 5 to 200 mm. The lower limit of the height H is more preferably no less than 10 mm, and more preferably no less than 15 mm. The upper limit of the height H is preferably no more than 150 mm, more preferably no more than 100 mm, more preferably no more than 80 mm, and particularly preferably no more than 50 mm.

[Reinforcement Frame]

The reinforcement frame, which is a component of the pleat element, may be formed by solidifying resin such as an adhesive and a seal material, by machining a resin plate or a metal plate, or by combining them.

The reinforcement frame with the solidified resin is preferably formed of rubber-like elastic body. It is possible to use various materials such as a well-known seal material including a silicon base and a butadiene base, and an elastic adhesive without departing from the object of the present invention. In this case, the reinforcement frame preferably has a thickness of 1 to 50 mm. The lower limit of the thickness is preferably no less than 2 mm, and more preferably no less than 5 mm. The upper limit of the thickness is preferably no more than 40 mm, more preferably no more than 30 mm, and more preferably no more than 20 mm.

When a plate is machined, a flat-shaped plate may be used or a bent portion in U shape or the like may be formed in a plate. The provision of the bent portion having a cross section of the U shape or the like is preferable since it increases the strength of the reinforcement frame and the area of the bonding to the pleat molding as well as facilitates hermetic connection with the housing with the bent portion. The end portion of the reinforcement frame in the present invention refers to the section facing the upper surface or the lower surface of the pleat molding when the flat-shaped reinforcement frame is used, or the surface of the bent portion when the reinforcement frame provided with the bent portion is used.

In this case, the plate preferably has a thickness of 0.1 to 5 mm. The lower limit of the plate thickness is preferably no less than 0.2 mm, and more preferably no less than 0.5 mm. The upper limit of the plate thickness is preferably no more than 4 mm, more preferably no more than 3 mm, and more preferably no more than 2 mm.

The height of the reinforcement frame is typically set according to the height H of the pleats. The inside dimension of the height of the reinforcement frame can be intentionally larger than the height of the pleats to provide a "space portion flow pass," as described later. When the reinforcement frame is formed of a plurality of combined materials, a nested structure is preferably used to increase the strength of the connection.

The bent portion of the reinforcement frame preferably has a width of 1 to 50 mm. The lower limit of the width of the bent portion is preferably no less than 5 mm, and more preferably no less than 10 mm. The upper limit of the width of the bent portion is preferably no more than 40 mm, more preferably no more than 30 mm, and more preferably no more than 20 mm.

[Pleat Element]

The pleat element is preferably of a flat type. The "flat type" refers to a type in which both edges of a gas separation membrane in parallel with the pleats are not bonded together, and a reinforcement frame (mainly in rectangular shape) having a total of four faces is provided therefor, with two faces for edges on both sides in the direction perpendicular to the pleats and for edges on both sides in the direction in parallel with the pleats.

The flat type pleat element includes a type in which the outer periphery of the pleat molding is directly bonded by resin such as an adhesive and a seal material, a type in which the abovementioned plate-shaped pleat element is bonded and fixed to the inner periphery of the machined reinforcement frame to form the pleat element, and a type in which both of them are combined.

Figure 3:
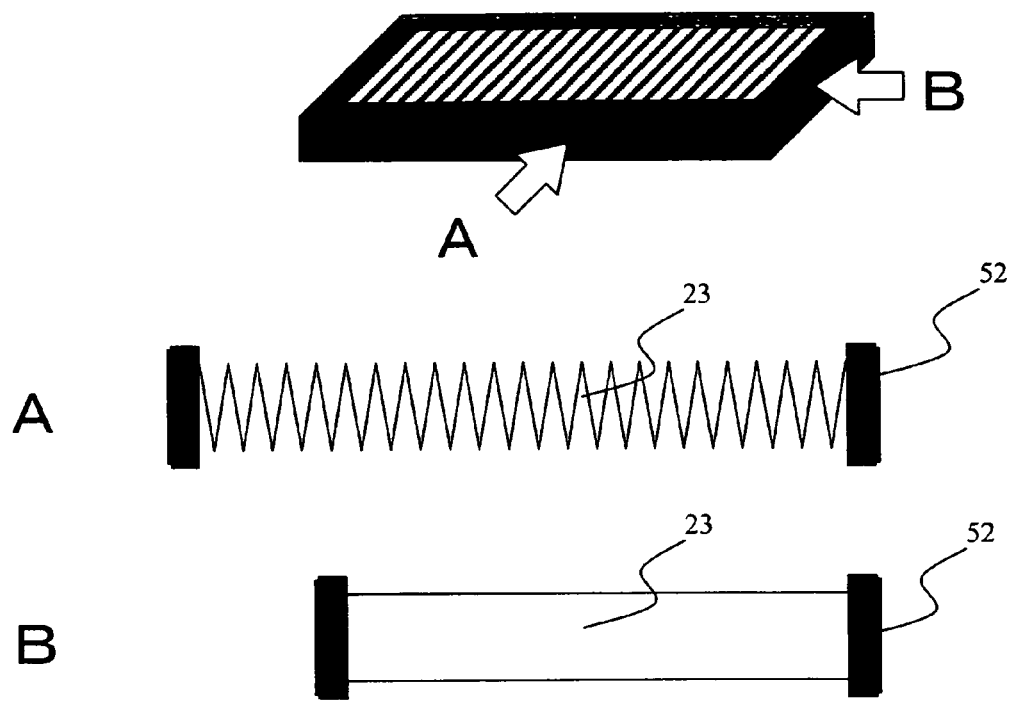

FIG. 3 is a schematic diagram showing an example of the flat pleat element of the type in which the reinforcement frame is directly bonded by an adhesive, a seal material or the like. A in FIG. 3 shows a cross section when viewed from the direction in parallel with the pleats, and B in the figure shows a cross section when viewed from the direction perpendicular to the pleats. A reinforcement frame 52 is formed on the outer periphery of the pleat molding 23 by solidifying resin.

Figure 4:
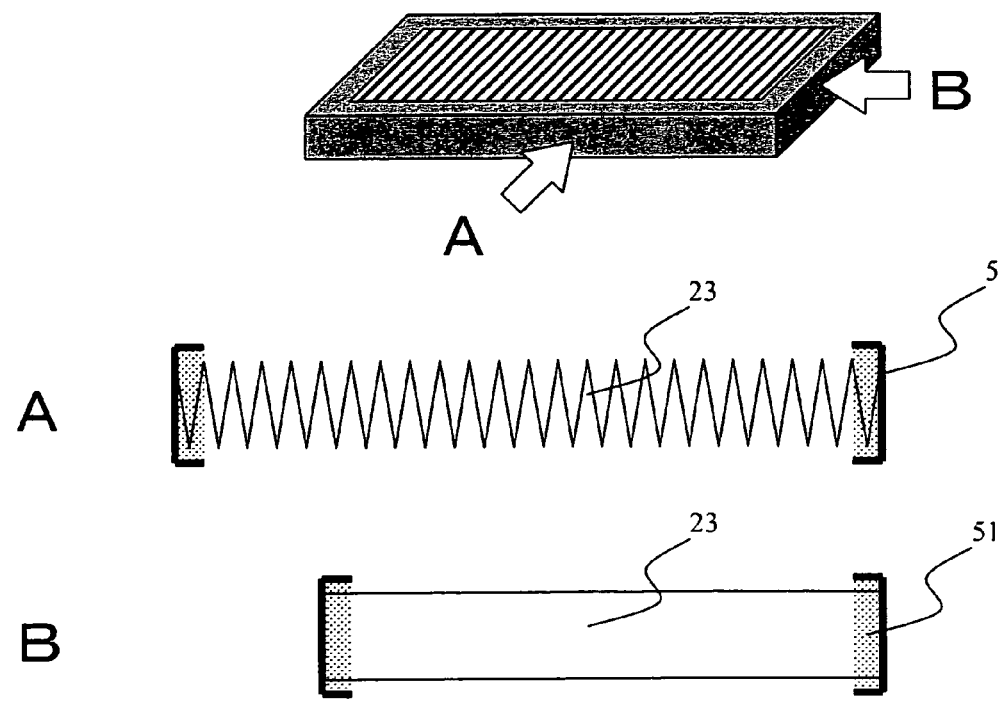
FIG. 4 is a schematic diagram showing an example of a flat type pleat element made with a plate-shape.

FIG. 4 is a schematic diagram showing an example of the flat pleat element of the type in which the plate reinforcement frame is machined. A in FIG. 4 shows a cross section when viewed from the direction in parallel with the pleats, and B in the figure shows a cross section when viewed from the direction perpendicular to the pleats. A method of bonding the outer periphery of the pleat molding 23 to the inner periphery of the reinforcement frame 5 may be realized, for example, by flowing an adhesive 51 into the inner periphery of the reinforcement frame with a U-shaped cross section and then putting and solidifying the pleat molding 23 therein as shown in FIGS. 4A and 4B, or by bonding through heat fusion.

Figure 5:
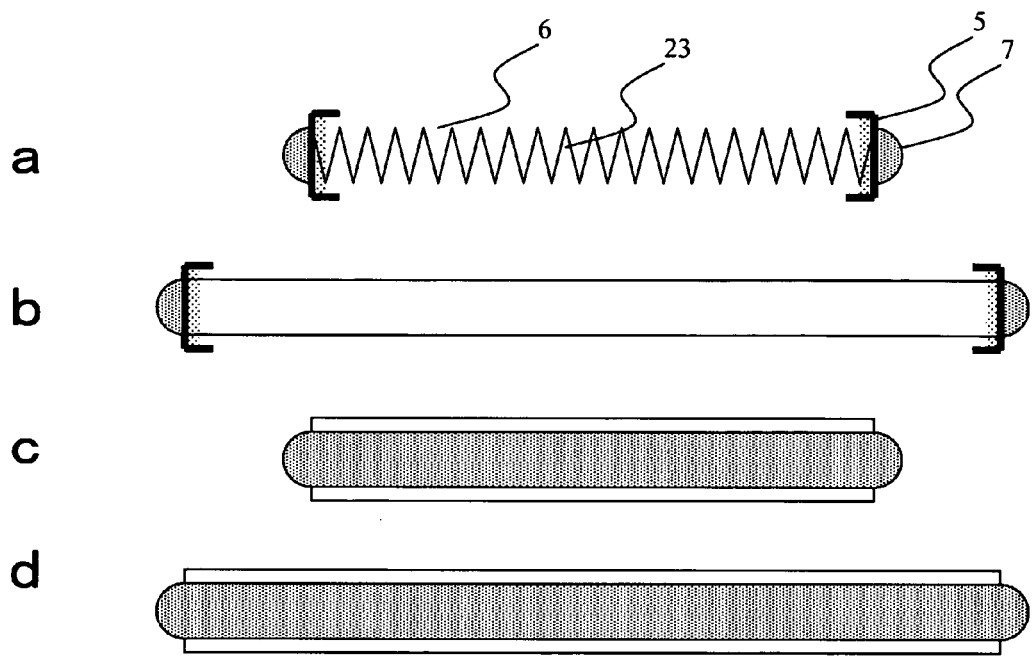
FIG. 5 is a schematic diagram showing an example of a seal material of the flat type pleat element.
Figure 6:
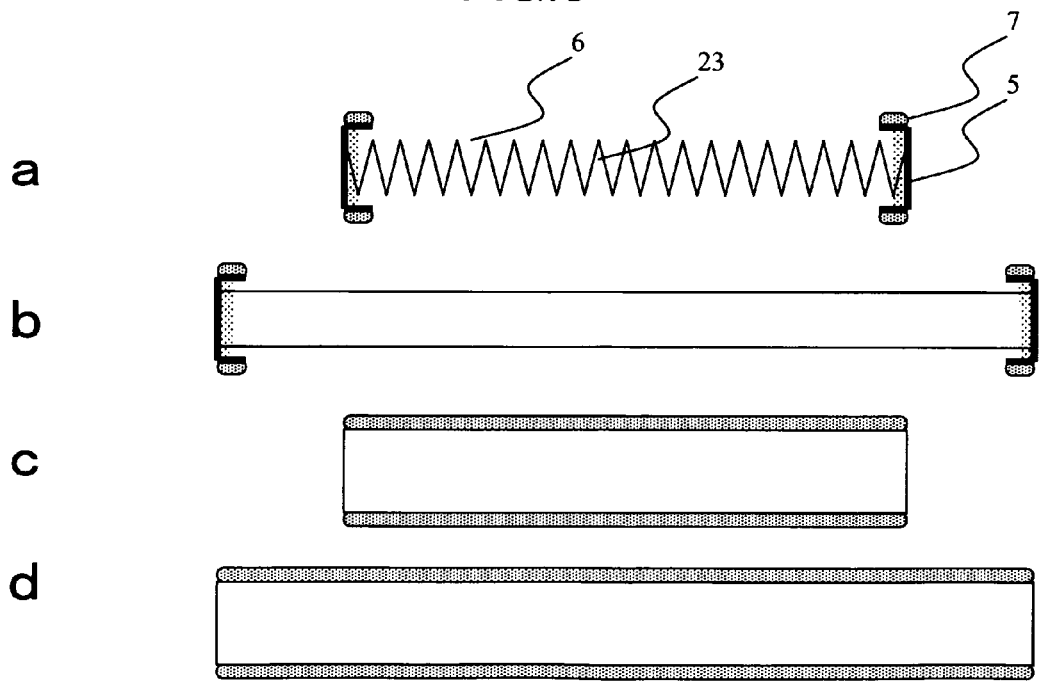
FIG. 6 is a schematic diagram showing an example of the seal material of the flat type pleat element.

FIGS. 5 and 6 are schematic diagrams showing examples of the seal material of the flat pleat element of the type in which the plate reinforcement frame is machined. A in FIGS. 5 and 6 shows a cross section of the pleat element cut perpendicularly to the pleats, b in the figures is a cross section of the pleat element cut in parallel with the pleats, c in the figures is an external view of the pleat element viewed in parallel with the pleats, and d in the figures is an external view of the pleat element viewed perpendicularly to the pleats. In FIG. 5, a seal material 7 is provided over the entire side of the reinforcement frame. In FIG. 6, the seal material 7 is provided over the entire bent section on the upper portion and lower portion of the reinforcement frame. As another example, the seal material may be provided for the housing and may not be provided for the reinforcement frame, or may be provided for both of the housing and the reinforcement frame.

In the pleat element formed by directly solidifying the outer periphery with a rubber-like elastic adhesive and resin such as the seal material, the reinforcement frame serves as the seal material and has excellent in hermeticity with the housing, as described later. This is preferable particularly in use conditions under internal pressure since a so-called self lock function is advantageously provided in which as a greater force to expand from the pleat element occurs, higher sealing with the housing is achieved.

When an additional measure is taken to ensure hermeticity, the seal material may not be provided for any of the housing and the reinforcement frame.

As the seal material 7, various seal materials can be used such as an O-ring, a rubber sheet, a metal sheet, and an adhesive without departing from the object of the present invention. Of them, the O-ring and rubber sheet are preferable. When the O-ring is used, the O-ring is preferably fixed by forming a groove in the housing or the reinforcement frame. When the rubber sheet is used as the seal material 7, the rubber sheet preferably has a thickness of 5 mm or less, more preferably 3 mm or less, and most preferably 1 mm since an extremely large thickness may cause the rubber sheet to be pushed with the internal pressure.

The pitch P shows a distance between the adjacent peaks of the pleat molding. When the pitch is uneven, the average of the pitches is assumed as P. The pitch P is preferably 0.1 to 10 mm. The lower limit of the pitch P is more preferably no less than 0.4 mm, more preferably no less than 0.6 mm, more preferably no less than 0.8 mm, and particularly preferably no less than 1.0 mm. The upper limit of the pitch P is more preferably no more than 8 mm, more preferably no more than 6 mm, and more preferably no more than 4 mm. The pitch P can be adjusted by the inner width of the reinforcement frame and the number of peaks of the pleats to be provided.

The ratio M of the pitch P to the thickness T of the gas separation membrane base material is preferably 0.5 to 3.0. The lower limit of the ratio M is more preferably no less than 0.8, more preferably no less than 1.0, more preferably no less than 1.2, and particularly preferably no less than 1.4, and most preferably no less than 1.6. The upper limit of the ratio M is more preferably no more than 2.5, more preferably no more than 2.2, more preferably no more than 2.1, particularly preferably no more than 2.0, and most preferably no more than 1.9. When the ratio M is less than 0.5, the small pitch reduces the air ventilation to easily impair the gas separation capability. When the ratio is more than 3.0, the large pitch reduces the membrane area to be provided and causes the gas separation membrane base material to flutter due to the air flow, thereby easily resulting in ware or breakage and straining the fixing portion on both ends of the gas separation membrane to easily cause the breakage thereof.

The ratio M of 2.0 means that the adjacent gas separation membrane basic material surfaces in the pleats are in contact with each other, and the ratio M of less than 2.0 means that the gas separation membrane basic material in the pleats is compressed and thinned. FIG. 2a shows an example of a V-shaped cross section with the ratio M of 3.0. FIG. 2b shows an example of a U-shaped cross section with the ratio M of 2.0.

A typical pleat element is a rectangular having a long side and short side. For the purpose of shortening the interval between beams of the housing, as described later, the short side of the pleat element is preferably not long more than necessary. The short side preferably has a length of 300 mm or less, more preferably 250 mm or less, more preferably 200 mm or less, more preferably 150 mm or less, and particularly preferably 100 mm or less. Even when the interval between beams does not need to be reduced, the short side preferably has a length of 1000 mm or less, and more preferably 500 mm or less.

The ratio (W/Le) of the length (Le) to the width (W) of the pleat element of the present invention is preferably 0.3 to 10.0 from the viewpoint of gas separation capability (separation efficiency) and pressure loss, more preferably 0.5 to 8.0, and particularly preferably 1.0 to 7.

[Gas Separator (Humidifier)]

The gas separator is formed by providing the pleat element with an appropriate intake port, exhaust port, and flow pass (these three are collectively referred to as a "flow pass" unless otherwise specified).

FIGS. 7B, 7C, 8B, and 8C are schematic diagrams showing the gas separator of the present invention. For the humidifier, a dotted line represents a flow pass on the wet side, and a solid line represents a flow pass on the dry side.

Figure 7:
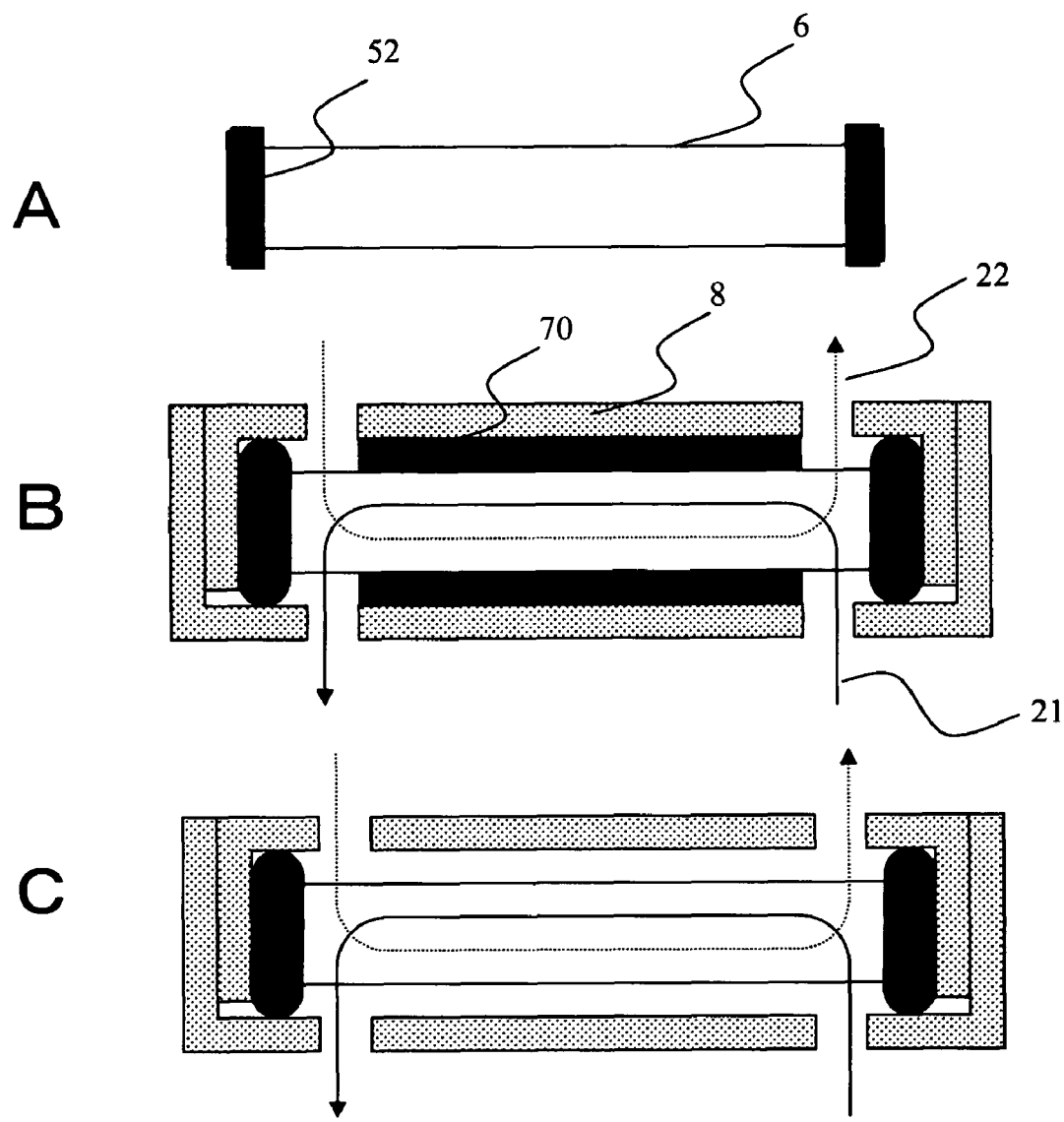
FIG. 7A is a schematic diagram showing the flat type pleat element.
FIGS. 7B and 7C are schematic diagrams showing a humidifier of the present invention.
Figure 8:
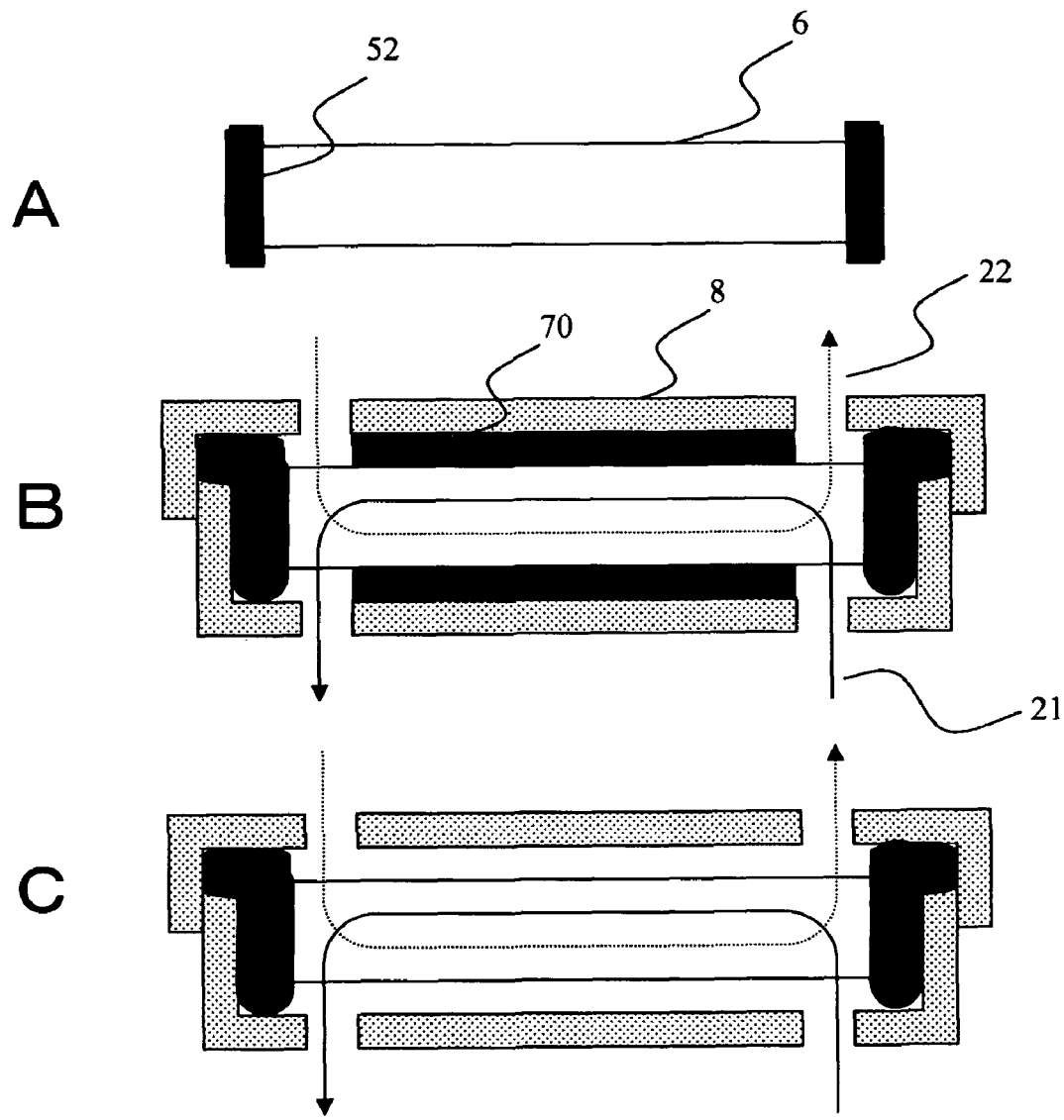
FIG. 8A is a schematic diagram showing a flat type pleat element.
FIGS. 8B and 8C are schematic diagrams showing a humidifier of the present invention.

FIGS. 7B and 8B show examples in which a flow pass forming means 70 is used to provide a "flow pass" on the pleat element. The flow pass forming means can be realized by a sheet-shaped material formed of a material with a high following property such as urethane foam and gel sheet having two openings (an intake port and an exhaust port) therein, and is put on the surface of the pleat element 6 to constitute the flow pass on the pleat element. The housing 8 in FIGS. 7 and 8 provides the pleat element with supplemental functions other than the gas separation (humidification) function, that is, the function of protection from mechanism breakage, the function of connection with an external circuit and the like.

FIGS. 7C and 8C show examples in which the housing 8 is used to form the "flow pass" instead of the flow pass forming means 70.

The use of the structures as shown in FIGS. 7 and 8 leads to space between the pleat element and the inner surface of the housing. In the present invention, the flow pass and the flow pass in inside of the pleat element are referred to as a "space portion flow pass" and a "basic portion flow pass," respectively. When the element has the space portion flow pass, a flow pass control means such as a wire mesh can be put on the space portion flow pass to adjust air flow resistance. For example, a higher air flow resistance in the space portion flow pass may increase the pressure loss but improve the gas separation (humidification) capability due to an increased air flow into the basic portion flow pass.

The ratio V:[(22M+22S)/(21M+21S)] of the wet-side flow pass volume to the dry-side flow pass volume in the humidifier of the present invention is preferably 0.5 to 100. The lower limit of V is preferably no less than 0.8, more preferably no less than 1.0, more preferably no less than 1.2, particularly preferably no less than 1.5, and most preferably no less than 2.0. The upper limit of V is more preferably no more than 50, more preferably no more than 20, more preferably no more than 10, and particularly preferably no more than 5. The value of V less than 0.5 extremely increases the pressure loss on the wet-side flow pass as compared with the pressure loss on the dry-side flow pass. The value of V more than 100 extremely increases the pressure loss on the dry-side flow pass as compared with the pressure loss on the wet-side flow pass.

[Intake Port and Exhaust Port of Gas Separator (Humidifier)]

Figure 9:
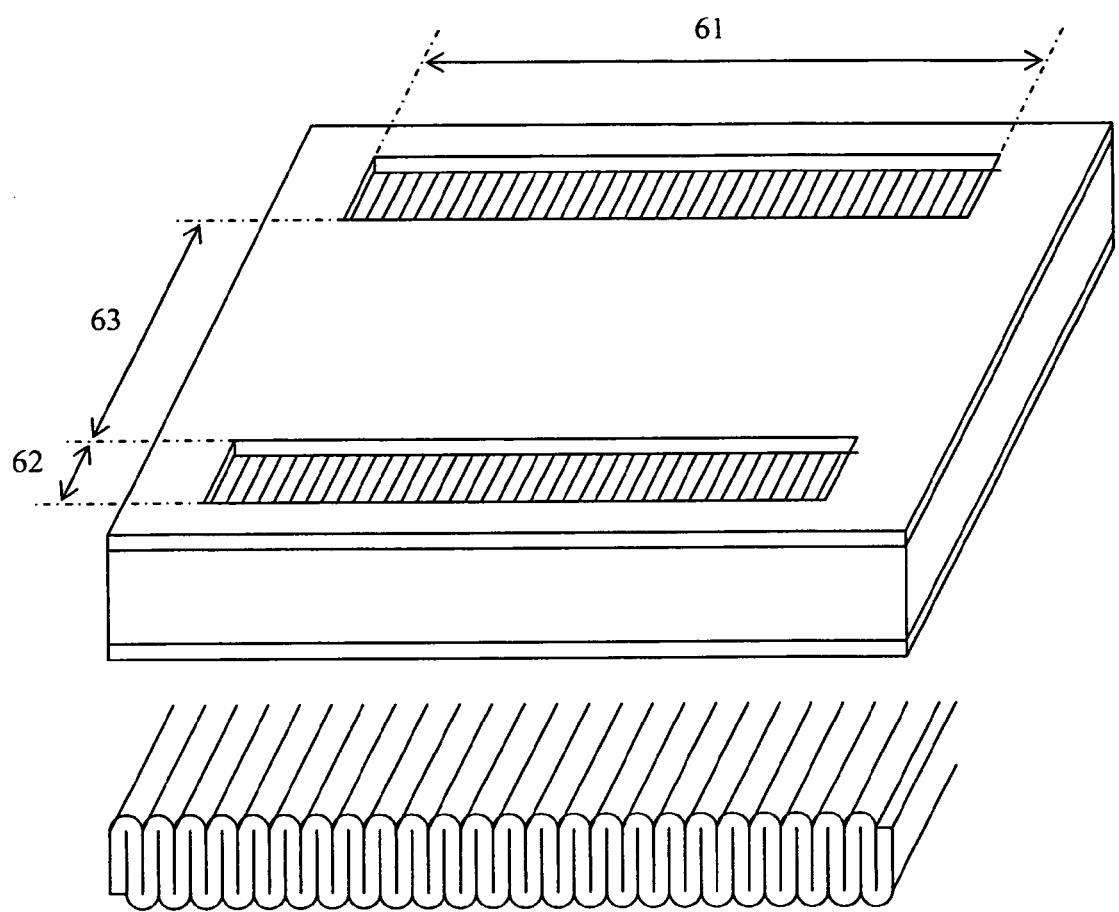
FIG. 9 is a schematic diagram showing the relationship between an intake port and an exhaust port of the pleat element.

The gas separator (humidifier) of the present invention has at least a set of an intake port and an exhaust port on both sides of the pleat element. In the present invention, gas is preferably flowed uniformly in the width direction of the pleat element from the viewpoint of membrane use efficiency. FIG. 9 is a schematic diagram showing an example of the relationship between the intake port and the exhaust port of the pleat element.

A width 61 of the intake port and exhaust port is 50% or higher relative to the inner width of the pleat element, more preferably 80% or higher, more preferably 90% or higher, and particularly preferably 95% or higher.

The cross-sectional area of the intake port and exhaust port relative to the cross-sectional area of outer piping is preferably 10% or higher, more preferably 20% or higher, more preferably 50% or higher, more preferably 100% or higher, particularly 200% or higher, and most preferably 300% or higher.

A preferable range of a length 62 of the intake port and exhaust port can be determined from the abovementioned width and cross-sectional area. In general, a preferable length can be determined in the range of 1 mm to 1 m. The lower limit of the length is more preferably no less than 5 mm, more preferably no less than 10 mm, and more preferably no less than 15 mm. The upper limit of the length is preferably no more than 20 cm, more preferably no more than 10 cm, and more preferably no more than 5 cm.

The intake port and exhaust port can be formed in an arbitrary shape within the abovementioned preferable range, such as a rectangle, an ellipse, a rhombus, a trapezoid, and a combination thereof. When a rectangle elongated in the width direction is used, two sides formed in semicircle rather than straight line is preferable since it can facilitate machining.

An interval 63 of the intake port and exhaust port is defined by the shortest length between the openings, not by the length between the centers of the intake port and exhaust port. In the present invention, the length is referred to as a contact length L. The ratio of the contact length L to the height H of the pleats is referred to as a ratio R (R=L/H).

The gas separator (humidifier) of the present invention is characterized by the ratio R of 0.1 to 7.0. The lower limit of the ratio R is preferably no less than 0.2, more preferably no less than 0.4, more preferably no less than 0.6, more preferably no less than 0.8, and particularly preferably no less than 1.0. The upper limit of the ratio R is preferably no more than 6.0, more preferably no more than 5.0, more preferably no more than 4.0, and most preferably no more than 3.0.

Taking the humidifier as an example, relative to a pleat element A having a height, a width, and a length, a pleat element B having a half length can achieve a half pressure loss, but the humidification capability is expected to be halved due to the halved volume and membrane area. However, the present inventors have surprisingly found that the pleat element B is more excellent than the pleat element A in the humidification capability per unit volume. As a result of the studies based on the findings, the present inventors have found that the humidifier having a specific ratio R has the following excellent characteristics as compared with a conventional humidifier having a relatively large ratio R, and have made the present invention.

(1) higher moisture movement with the same humidification membrane structure, the same membrane area, and the same volume.

(2) lower pressure loss with the same humidification membrane structure, the same membrane area, and the same volume.

When the ratio R is less than 0.1, the gas cannot be sufficiently penetrated into the depth of the pleats and preferable humidification capability may not be provided. When the ratio R is larger than 7.0, the long contact length may not provide preferable pressure loss.

A preferable range of the contact length L can be determined from the ratio R and the pleat height H. In general, the preferable contact length L can be determined within the range of 10 to 1000 mm. The lower limit of the contact length L is more preferably no less than 20 mm, more preferably no less than 30 mm, more preferably no less than 40 mm, and particularly preferably no less than 50 mm. The upper limit of the contact length L is more preferably no more than 500 mm, more preferably no more than 300 mm, more preferably no more than 200 mm, and particularly preferably no more than 150 mm. In this manner, the length of the pleat element is several hundreds mm at maximum in terms of the relationship between the ratio R and the pleat height H, but the width of the pleat element takes various values of dimension depending on the intended flow rate, humidification capability, and pressure loss.

[Housing]

The pleat element can be connected to the housing to constitute a practical gas separator (humidifier) provided with the supplemental functions (such as the function of protection from mechanical breakage and the function of connection with an external circuit) other than the gas separation (humidification) function.

As the housing, it is preferable to form a hermetic container by placing two box-shaped pressure plates on both surfaces of the pleat element and bringing the plates into close contact with part of the reinforcement frame.

Figure 10:
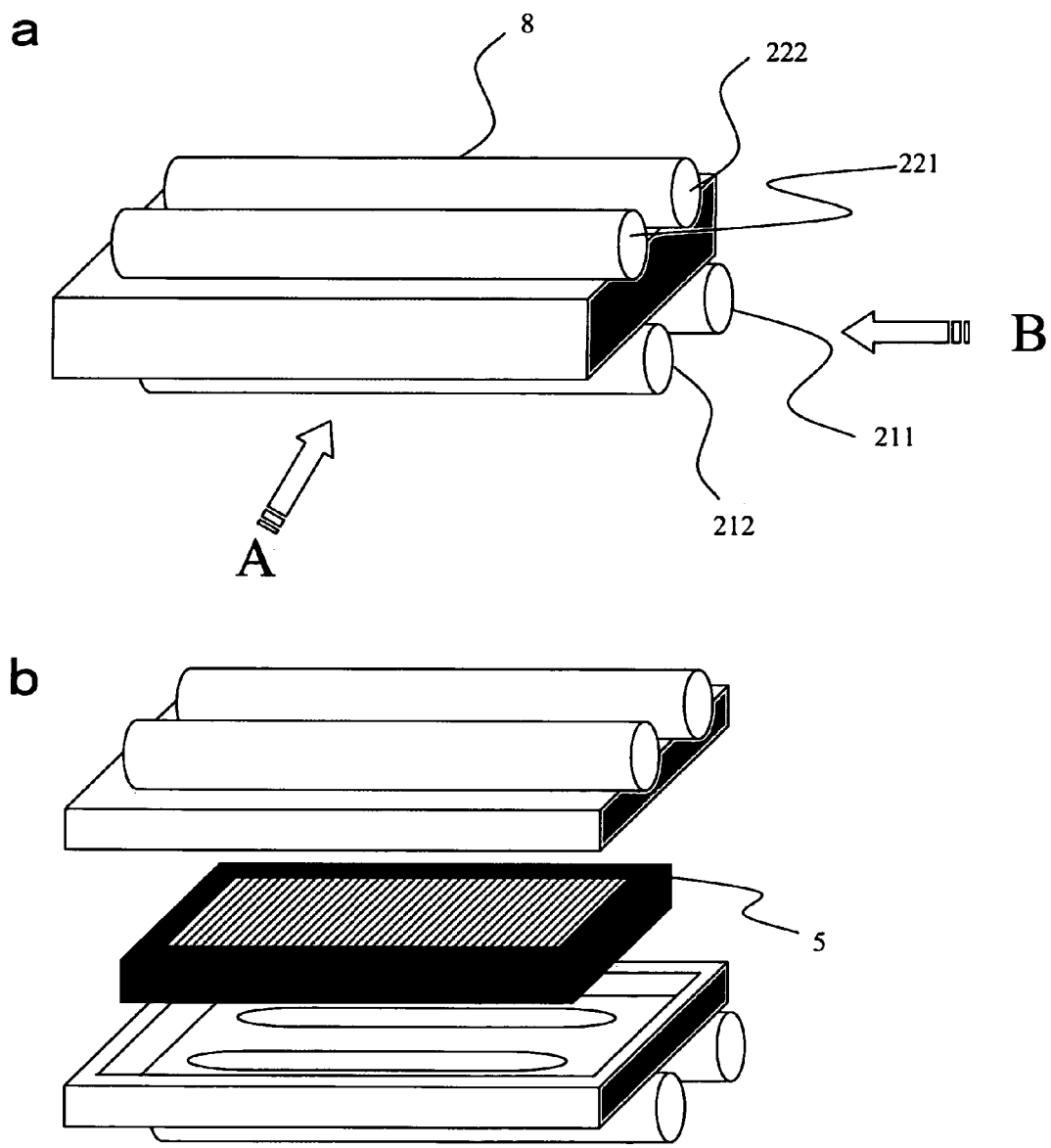
FIGS. 10a and 10b are schematic diagrams for explaining a pressure plate type housing of the present invention.

FIGS. 10a and 10b are schematic diagrams for explaining a housing of the pressure plate type which is a preferable example of the pleat element housing of the present invention.

The structure shown can be used to provide the gas separation (humidification) apparatus with robustness and reliable hermeticity which can withstand high-pressure gas.

Most of the conventional separation apparatuses of the flat pleat type are disposable as described above, and ease of maintenance to take the pleat element out from the separation apparatus has not been considered. However, when the pressure plate type housing of the present invention is used, high ease of maintenance can be provided simultaneously with a compact apparatus structure.

FIG. 10a is a perspective view showing the outer appearance of a first example when the gas separation humidifier of the present invention is used as a humidifier, and FIG. 10b is an exploded view of the humidifier.

The housing and the pleat element 6 are in hermetical contact with each other via the reinforcement frame 5, that is, in close contact with each other.

Figure 11:
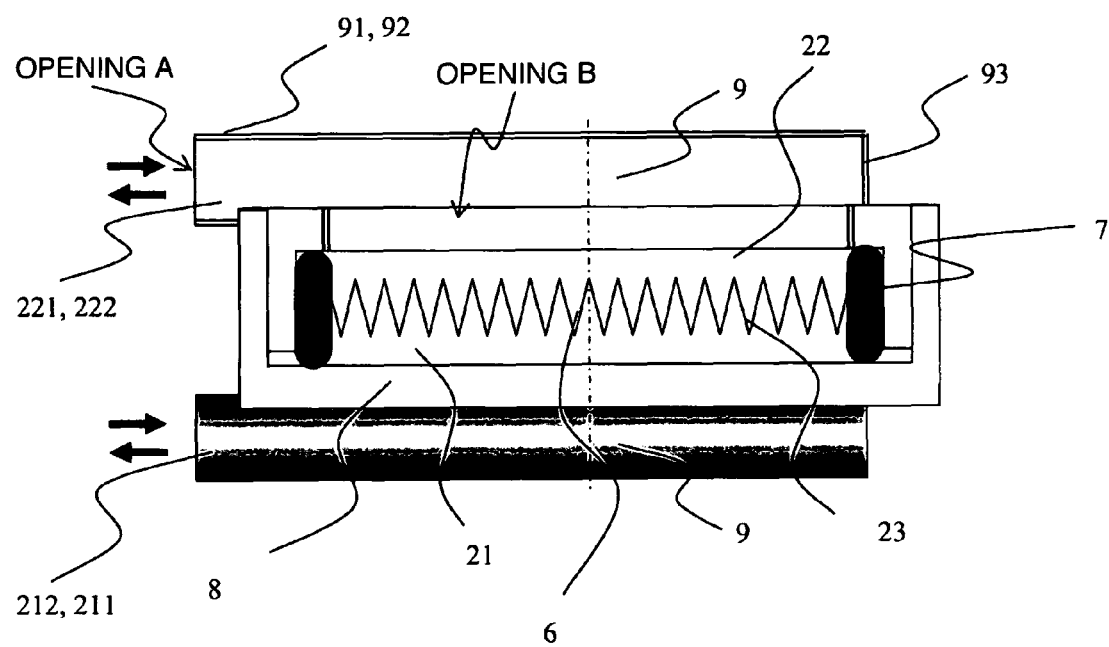
FIG. 11 is a sectional view of FIG. 10a in a direction B.

FIG. 11 is a cross section of FIG. 10a in the direction B. While flow passes on the lower side and upper side of the water vapor permeating membrane are used as a dry-side flow pass 21 and a wet-side flow pass 22, respectively, they can be reversed as appropriate in accordance with the object. The dry-side flow pass 21 and the wet-side flow pass 22 are hermetically separated by the water vapor permeating membrane basic material 23, the reinforcement frame 5 serving also as the seal material, and the housing 8. The dry-side flow pass 21 is connected to a dry-side intake port 211 and a dry-side exhaust port 212. The wet-side flow pass 22 is connected to a wet-side intake port 221 and a wet-side exhaust port 222.

Wet gas introduced through the wet-side intake port 221 flows from left to right in the wet-side flow pass 22 shown by the dotted line of FIG. 7 and is discharged from the wet-side exhaust port 222. On the other hand, dry gas introduced through the dry-side intake port 211 flows from right to left in the dry-side flow pass 21 shown by the solid line of FIG. 7 and is discharged from the dry-side exhaust port 212. In the process, the water vapor contained in the wet gas moves to the dry gas across the water vapor permeating membrane.

A pair of pressure plates can be bonded in an arbitrary manner. For example, bonding with an adhesive and welding, and tightening with a belt and a bolt can be used.

When the gas used therein is at high pressure, a reinforcement material may be provided around the housing to avoid the possibility of deformation.

The housing of the present invention preferably has all the intake ports, exhaust ports, and pressure absorbers (as described later) integrally formed.

The integral formation means that the housing material is not divided by bolting or screwing. For example, even when the housing material is separated into some parts, the separated parts are "integrally formed" if they are welded or the like.

Such a housing structure can significantly improve durability to vibration and pressure changes.

Figure 12:
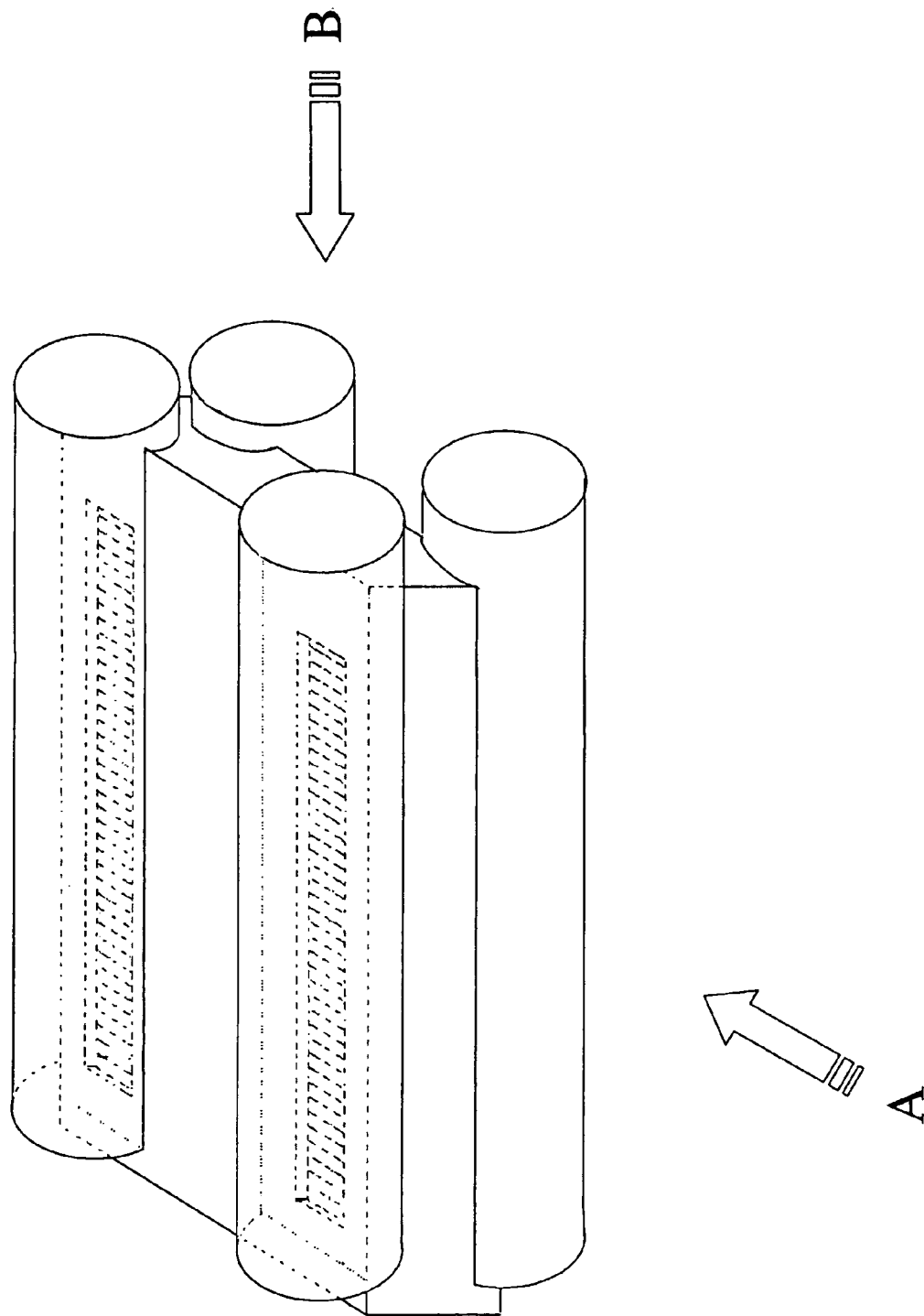
FIG. 12 is a schematic diagram for explaining an example of the housing of the humidifier.
Figure 13:
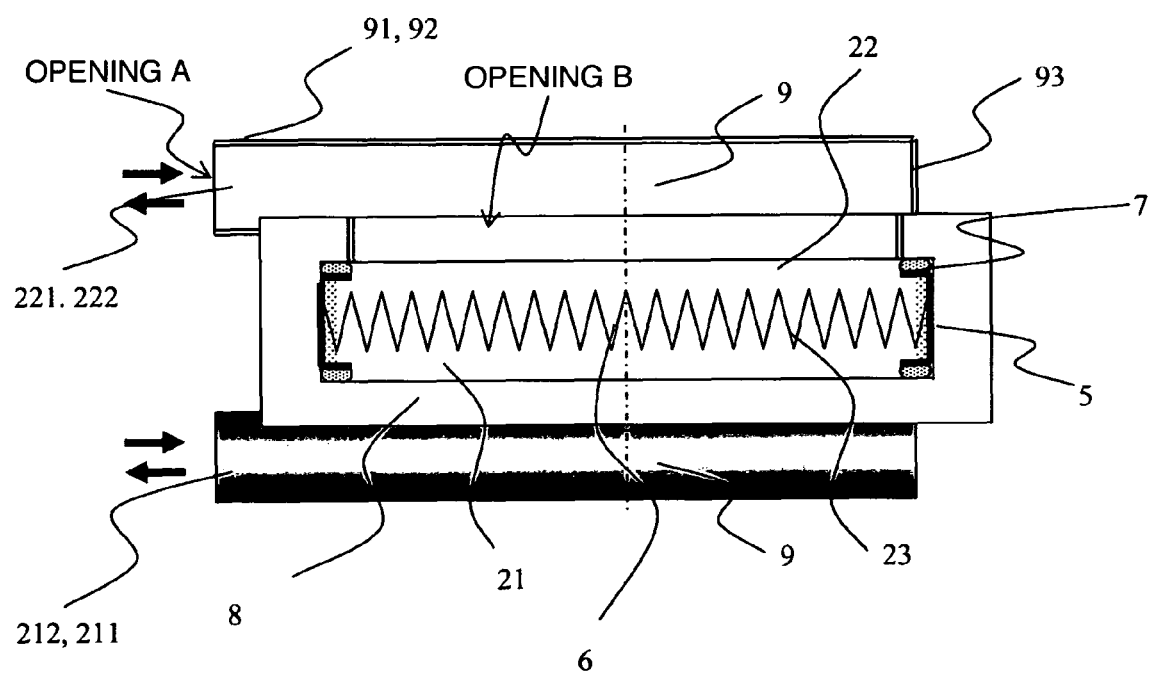
FIG. 13 is a sectional view of FIG. 12 in a direction A.

FIG. 12 is a schematic diagram for explaining the housing in a preferable example of the humidifier of the present invention. FIG. 13 is a cross section of FIG. 12 in the direction A.

The housing is in hermetical contact (close contact) with a pleat element 6 via a reinforcement frame 5.

Figure 14:
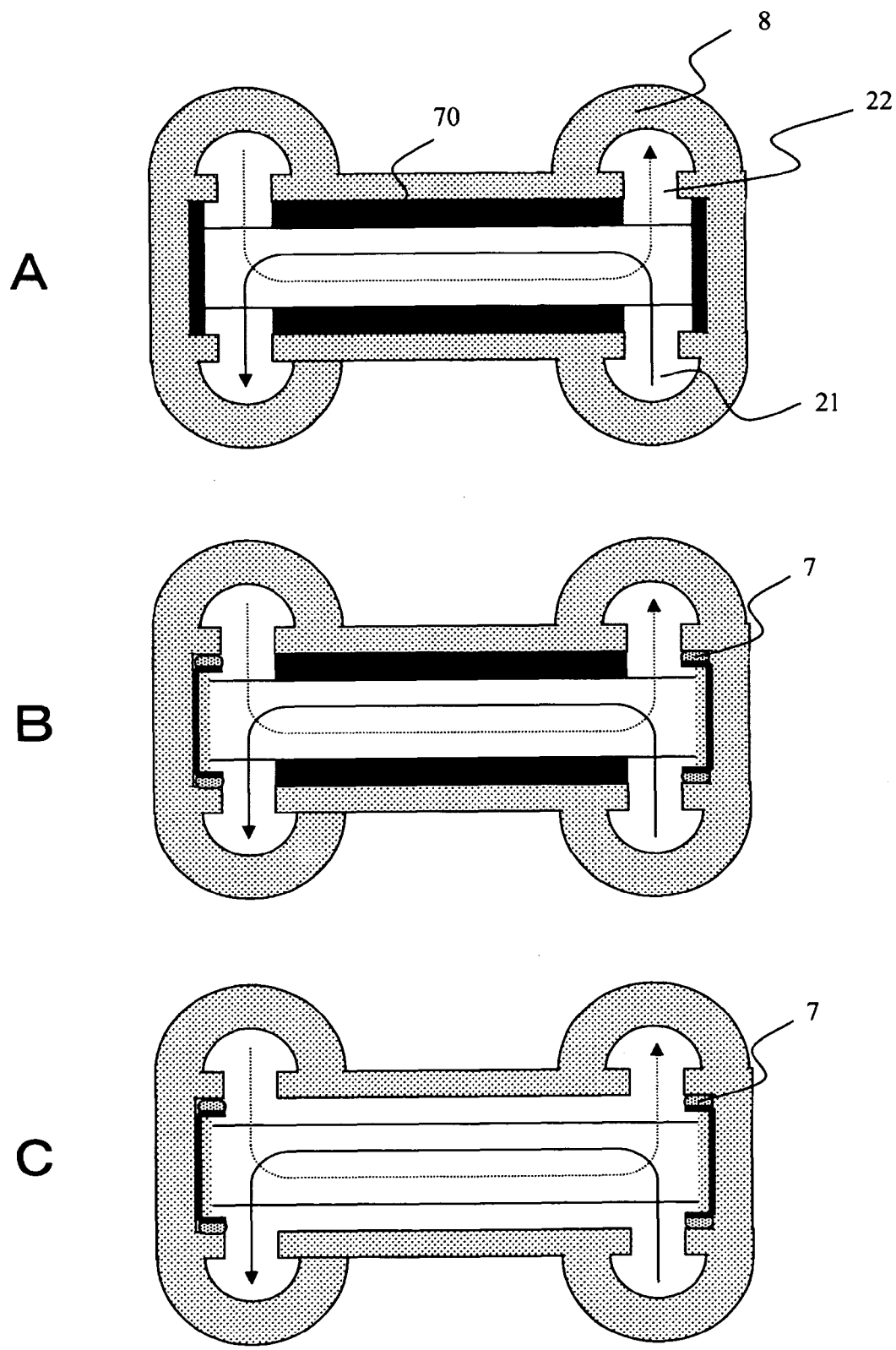
FIGS. 14A, 14B, and 14C are schematic diagrams showing an example of the humidifier of the present invention.

FIG. 14 is a cross section of FIG. 12 in the direction B. While flow passes on the lower side and upper side of the water vapor permeating membrane are used as a dry-side flow pass 21 and a wet-side flow pass 22, respectively, these can be reversed as appropriate in accordance with the object. The dry-side flow pass 21 and the wet-side flow pass 22 are hermetically separated by a water vapor permeating membrane basic material 23, the reinforcement frame 5, the housing 8, and as required, a seal material 7 intervening between the reinforcement frame and the pressure plate. The dry-side flow pass 21 is connected to a dry-side intake port 211 and a dry-side exhaust port 212. The wet-side flow pass 22 is connected to a wet-side intake port 221 and a wet-side exhaust port 222.

Wet gas introduced through the wet-side intake port 221 flows from left to right in the wet-side flow pass 22 shown by a dotted line of FIG. 14 and is discharged from the wet-side exhaust port 222. On the other hand, dry gas introduced through the dry-side intake port 211 flows from right to left in the dry-side flow pass 21 shown by a solid line of FIG. 14 and is discharged from the dry-side exhaust port 212. In the process, the water vapor contained in the wet gas moves to the dry gas across the water vapor permeating membrane.

Various structures can be used for the housing without departing from the object of the present invention. For example, it can be formed by molding of resin or the like. Various materials such as stainless steel, aluminum, and plastic can be used for the material of the housing. It can be reduced in weight as required by a known material technique such as ribs and honeycomb structures. The housing preferably has a sufficiently smooth surface in contact with the pleat element.

The housing is in hermetical contact with the pleat element 6 via the reinforcement frame 5. In this case, the seal material 7 may be provided, as required, between the housing and the reinforcement frame 5.

[Housing and Pressure Absorber]

The pressure absorber of the present invention is the designation of a rectifying means used to prevent local blowing in the intake port and exhaust port of the gas separation (humidifier) apparatus, and is provided to realize some of the supplemental functions provided by the housing between he external piping and the intake port and the exhaust port. In the present invention, the pressure absorber is preferably used in many cases.

As shown in FIG. 8, the pressure absorber has an opening A and an opening B on the external piping side and the pleat element side, respectively. The opening A has the same shape as that of the external piping. The opening B has the same shape as that of the intake port and exhaust port of the pleat element. The opening B often has a greater width than that of the opening A. When the external piping has a width close to that of the intake port and exhaust port, the pressure absorber can be omitted.

Any structure can be used for the pressure absorber as long as it can provide the abovementioned rectifying function. For example, it is preferable to use a pipe structure (1) connecting the opening A with the opening B and having a relatively large length between the openings A and B, a structure (2) including a filter made of non-woven fabric or net inside the piping, and a structure (3) in which air flows through the opening A and opening B are perpendicular to each other. The use of these structures allows relatively uniform pressure distribution and speed distribution in the opening B to effectively use the gas separation (water vapor permeating) membrane over the entire surface of the pleat element. The structure (3) is more preferable since it is more compact and achieves a lower pressure loss as compared with the other structures. "Perpendicular to each other" means that the air the direction of the air flow is turned inside of the pipe and includes an angle from 30 to 150 degrees in addition to 90 degrees.

For example, in the humidifier, in the wet-side flow pass 22 represented by the dotted line, the gas introduced through an opening A91 of the pipe on the left from an external circuit hits an opposite surface 93 closed by a metal plate or the like and forms a relatively uniform pressure field. Then, the gas is introduced into the pleat element through the opening B in the lower portion of the pipe on the exhaust side, and is discharged into the pipe on the right through the opening B after water vapor contained therein is transmitted to the dry-side flow pass 21 via the water vapor permeating membrane. The discharged gas forms a relatively uniform pressure field inside the pipe and then is discharged to an external circuit through an opening A92. FIGS. 11 and 13 are schematic diagrams showing an example of the pressure absorber as well.

Figure 15:
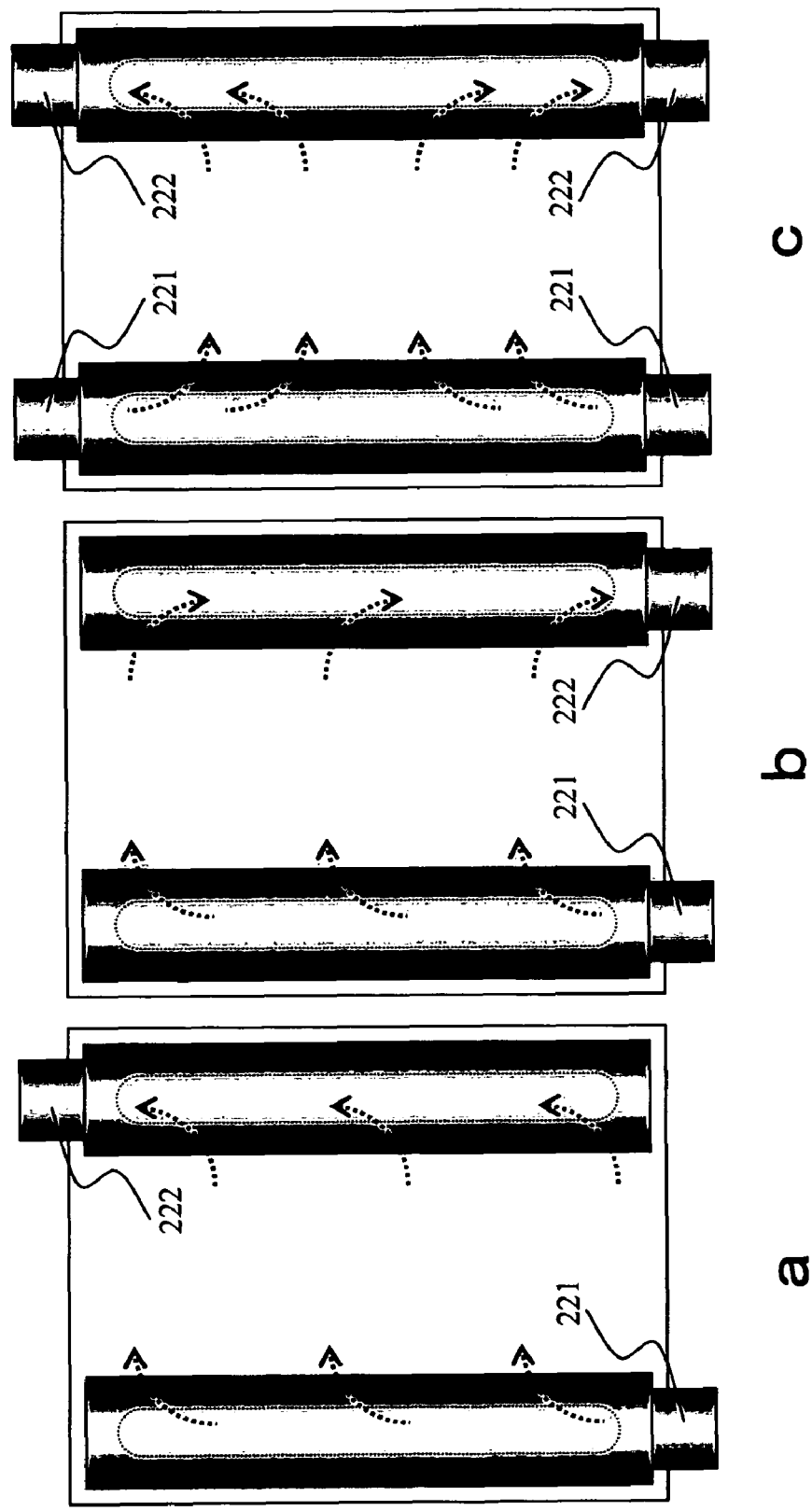
FIGS. 15a, 15b, and 15c are schematic diagrams showing an example of flow of air in a pressure absorber.

FIG. 15 is a schematic diagram showing an example of flow of gas in the pressure absorber. FIG. 15a shows a flow pass structure in which gas flows from the left front to right back when the intake port and exhaust port of the gas separation (humidification) apparatus are viewed from above. FIG. 15b shows a flow pass structure in which gas flows from the left front to right front. FIG. 15c shows a flow pass structure in which gas flows from the intake port at two points on the left front and left back to the exhaust port at two points on the right front and right back. Of them, the flow pass structure in FIG. 15c is most preferable in the pressure absorbing effect.

The volume of the pressure absorber is defined as the volume of space closed by the opening A and the opening B. When the product of the cross-sectional area of the external piping and the inner width of the pleat element is used as a reference volume, the volume of the pressure absorber is preferably 0.1 to 100 relative to the reference volume. In the present invention, the ratio is referred to as a ratio VB. The lower limit of the ratio VB is more preferably no less than 0.2, more preferably no less than 0.5, more preferably no less than 1.0, and particularly preferably no less than 2.0. A ratio VB of less than 0.1 may not provide a sufficient pressure absorbing effect. The upper limit of the ratio VB is not particularly limited, but a ratio VB of more than 100 is not preferable since the apparatus is increased in size more than necessary.

The width of the pressure absorber is preferably 50% to 800% relative to the width of the intake port and exhaust port of the pleat element. The lower limit of the width is more preferably no less than 70%, more preferably no less than 80%, and more preferably no less than 90%. The upper limit of the width is more preferably no more than 600%, more preferably no more than 400%, and more preferably no more than 200%.

The width of the opening B of the pressure absorber is preferably 50% or higher relative to the width of the pressure absorber, more preferably 80% or higher, more preferably 90% or higher, and more preferably 95% or higher.

The cross-sectional area of the opening B of the pressure absorber is preferably 50% or higher relative to the cross-sectional area of the opening A, more preferably 100% or higher, more preferably 200% or higher, more preferably 300% or higher, particularly preferably 400% or higher, and most preferably 500% or higher.

In the humidifier, various known forms may be used such as opposed flow, parallel flow, cross flow, and radiation flow, as a form of contact between dry gas and wet gas via the water vapor permeating membrane. Particularly the opposed flow or parallel flow is preferable.

[Stacking of Pleat Element]

In the present invention, a large membrane area can be obtained by providing a plurality of pleat elements in the housing. For example, in the present invention, the height P of the pleats is preferable 5 mm to 200 mm, but when the size of the humidifier in the plane direction is significantly limited for some reasons and the size thereof is less limited in the height direction, then a large membrane area can be achieved by stacking elements with a height of 200 mm or smaller such that the dry-side flow pass or wet-side flow pass is shared.

[Operational Method of Gas Separator (Humidifier)]

The present inventors have diligently studied the gas separator (humidifier) including the pleat molding and its operational method, and found that the membrane use efficiency can be further improved by increasing the gas flow rate per unit time to the outer shape volume of the pleat element.

The operational method of the gas separator (humidifier) of the present invention is characterized by the volume rate of flow of 200 or higher. The volume rate of flow in the present invention is defined as a ratio of the flow rate (NL) of gas (dry air in the humidifier) supplied to the whole apparatus per minute to the outer volume (Ve) of the pleat element. NL means the volume of gas in a standard state. The lower limit of the volume rate of flow is preferably no less than 400, more preferably no less than 600, more preferably no less than 800, more preferably no less than 1000, and particularly preferably no less than 1200. The upper limit of the volume rate of flow is not particularly limited, but it is preferably no more than 100000, more preferably no more than 50000, and more preferably no more than 10000.

An increase in the volume rate of flow at a certain flow rate requires a reduction in volume of the pleat element according to the definition. For example, when the pleat element is reduced to a similar figure of half size (height to 0.5 times, width to 0.5 times, and length to 0.5 times), then the volume is reduced to ⅛ but the pressure loss is doubled. The operational method of the present invention includes such a case, and for example when an increased pressure loss is not preferable, the size can be changed with a height to 0.5 times, a width to 0.71 times, and a length to 0.35 times to maintain the equal pressure loss while the volume is still reduced to ⅛.

The unit of the volume rate of flow is (1/min) and has the dimension which is the reciprocal of time. Specifically, the volume rate of flow of 200 or higher is equivalent to the gas residence time in the gas separator (humidifier) of 0.3 or less on average.

The cross-sectional area flow rate of the present invention is defined as the ratio of the flow rate (NL/min) of dry gas per minute to the cross-sectional area (cm²) cut perpendicularly to the pleat direction. The unit of the cross-sectional area flow rate in the present invention (10 m/min) has the dimension of speed. Preferably, the volume rate of flow (residence time) is not extremely low and the cross-sectional area flow rate (speed of gas in the apparatus) is not extremely high. This means that the gas separator (humidifier) having a small ratio R is more preferable with a certain volume. Specifically, the gas separator (humidifier) and its operational method of the present invention are the invention made to embody the same technical idea in terms of the apparatus and operational method. The upper limit of the cross-sectional area flow rate is preferably no more than 100, more preferably no more than 80, more preferably no more than 60, more preferably no more than 40, and particularly preferably no more than 20.

[Performance of Humidifier]

Description will hereinafter be made of the performance of the gas separator of the present invention when it is used as the humidifier.

The performance of the humidifier of the present invention can be evaluated in the following measures. In the following description, for simplicity, the dry-side inlet, dry-side outlet, wet-side inlet, and wet-side outlet are referred to as DI, DO, WI, and WO, respectively.

Moisture movement (g/min)=$DO$ water vapor flow rate–$DI$ water vapor flow rate

Moisture movement per volume (g/min/L)=moisture movement/volume of pleat element Average water vapor partial pressure difference (kPa) =($WI$ water vapor partial pressure+$WO$ water vapor partial pressure–$DI$ water vapor partial pressure–$DO$ water vapor partial pressure)/2

Exchange capability (g/min/kPa/L)=moisture movement/average water vapor partial pressure difference Exchange capability per volume (g/min/kPa/L)=exchange capability/volume of pleat element Pressure loss sum (kPa)=$WI$ total pressure–$WO$ total pressure+$DI$ total pressure–$DO$ total pressure Total performance (g/min/kPa²/L)=exchange capability per volume/pressure loss sum (kPa)×1000

The exchange capability per volume is preferably 0.1 or higher, more preferably 0.2 or higher, more preferably 0.5 or higher, more preferably 0.7 or higher, and particularly preferably 1.0 or higher. The exchange capability per volume of less than 0.1 is not preferable since the apparatus size necessary for sufficient humidification is extremely increased. In many humidification uses, the exchange capability per volume of 2.5 or higher can sufficiently achieve the object of the invention.

The pressure loss on both of the dry side and wet side is preferably 50 kPa or lower, more preferably 20 kPa or lower, more preferably 10 kPa or lower, more preferably 5 kPa or lower, and particularly preferably 3 kPa or lower. The high pressure loss of more than 50 kPa is not preferable since the energy lost in the humidifier is not negligible in many humidification uses.

The total performance is preferably 10 or higher, more preferably 20 or higher, more preferably 40 or higher, more preferably 60 or higher, and particularly preferably 80 or higher.

EXAMPLES

Example 1

Humidification Membrane

A composite humidification membrane was provided by immersing microporous membrane made of polyethylene (a thickness of 16 μm, a weight per square meter of 9 g/m², a porosity of 40%, an air permeability of 300 seconds) in perfluoroion-exchange resin solution (manufactured by Asahi Kasei Corporation, Aciplex-SS-1000) with a continuous immersion apparatus before drying at 80° C. A coating weight of the perfluoroion-exchange resin at this point was 4 g/m².

[Pleat Element]

A net A made of polypropylene (a weight per square meter of 104 g/m², a diameter of fiber of 0.3 mm, an aperture ratio of 66%, a thickness of 0.7 mm) and a net B made of polypropylene (a weight per square meter of 50 g/m², a diameter of fiber 0.25 mm, an aperture ratio of 86%, a thickness of 0.5 mm) were placed as a breathable reinforcement material on one side of the formed humidifying membrane. A net C made of polypropylene (a weight per square meter of 50 g/m², a diameter of fiber 0.25 mm, an aperture ratio of 86%, a thickness of 0.5 mm) was placed on the opposite side of the humidifying membrane. Pleating was performed with a height H of pleats set to 40 mm. With the pleats used as the pleat element, a reinforcement frame having a width of 400 mm, a length of 240 mm, and a height of 44 mm (with a width of a bent portion of 10 mm) was used. An epoxy adhesive was used to bond the pleat molding to the reinforcement frame and they were sealed, thereby forming the flat-type pleat element. The number N of peaks was set to 137 and the pitch P of pleats to 2.9 mm. The ratio M of the pitch P to the thickness T of the humidifying membrane basic material was 1.7.

[Humidifying Element and Humidifier]

The pleat element was connected to a housing as shown in FIG. 11 to constitute a humidifying element and a humidifier. The cross-sectional ratio C between a basic portion flow pass and a space portion flow pass was 1.1 on the wet side and 1.2 on the dry side. The ratio V of the wet-side flow pass volume to the dry-side flow pass volume was 1.5. A wire mesh (with a thickness of 3 mm, a wire diameter of 1.5 mm, an opening area ratio of 78%) was placed as a flow pass control means in a space portion on the wet side. The ratio R of the length between an intake port and an exhaust port to the pleat height H was set to 3.6. The connection was made such that the intake air and exhaust air of the wet air and dry air are in contact with each other as counter flow.

[Evaluation]

The wet air at a relative humidity of 90% and a temperature of 80° C. was supplied at a flow rate of 3000 NL/min to the wet-side inlet of the humidifier under control of a valve provided for the wet-side outlet to provide the pressure of 40 kPaG at the wet-side inlet. The dry air at a relative humidity of 1% and a temperature of 80° C. was supplied at a flow rate of 3000 NL/min to the dry-side inlet of the humidifier under control of a valve provided for the dry-side outlet to provide the pressure of 60 kPaG at the dry-side outlet.

After the supply of the air to the humidifying element for an hour under the conditions, the relative humidity and the temperature were measured at the wet-side outlet and dry-side outlet to calculate moisture movement through the humidifying membrane. The pressures loss between the wet-side intake and exhaust ports and the dry-side intake and exhaust ports was measured.

Table 1 shows the results.

Example 2

A humidifying membrane and a breathable reinforcement material of the same type as those in Example 1 were used and pleating was performed with the pleat height H set to 40 mm. With the pleats used as the pleat element, a reinforcement frame having a width of 400 mm, a length of 120 mm, and a height of 44 mm was used. An epoxy adhesive was used to bond the pleat molding to the reinforcement frame and they were sealed, thereby forming the flat-type pleat element. The number N of peaks was set to 176 and the pitch P of pleats to 2.3 mm. The ratio M of the pitch P to the thickness T of the humidifying membrane basic material was 1.4.

The pleat element was connected to a housing as shown in FIG. 11 to constitute a humidifying element and a humidifier. The cross-sectional ratio C between a basic portion flow pass and a space portion flow pass was 1.1 on the wet side and 1.2 on the dry side. The ratio V of the wet-side flow pass volume to the dry-side flow pass volume was 1.5. A wire mesh (with a thickness of 3 mm, a wire diameter of 1.5 mm, an opening area ratio of 78%) was placed as a flow pass control means in a space portion on the wet side. The ratio R of the length between an intake port and an exhaust port to the pleat height H was set to 1.9. The humidifier was evaluated under the same conditions as those in Example 1.

Table 1 shows the results.

Example 3

A humidifying membrane and a breathable reinforcement material of the same type as those in Example 1 were used and pleating was performed with the pleat height H set to 40 mm. With the pleats used as the pleat element, a reinforcement frame having a width of 300 mm, a length of 300 mm, and a height of 44 mm was used. An epoxy adhesive was used to bond the pleat molding to the reinforcement frame and they were sealed, thereby forming the flat-type pleat element. The number N of peaks was set to 103 and the pitch P of pleats to 2.9 mm. The ratio M of the pitch P to the thickness T of the humidifying membrane basic material was 1.7.

The pleat element was connected to a housing as shown in FIG. 11 to constitute a humidifying element and a humidifier. The cross-sectional ratio C between a basic portion flow pass and a space portion flow pass was 1.1 on the wet side and 1.2 on the dry side. The ratio V of the wet-side flow pass volume to the dry-side flow pass volume was 1.5. A wire mesh (with a thickness of 3 mm, a wire diameter of 1.5 mm, an opening area ratio of 78%) was placed as a flow pass control means in a space portion on the wet side. The ratio R of the length between an intake port and an exhaust port to the pleat height H was set to 5.8. The humidifier was evaluated under the same conditions as those in Example 1.

Table 1 shows the results.

Comparative Example 1

A humidifying membrane a breathable reinforcement material of the same type as those in Example 1 were used and pleating was performed with the pleat height H set to 24 mm. With the pleats used as the pleat element, a reinforcement frame having a width of 240 mm, a length of 430 mm, and a height of 28 mm was used. An epoxy adhesive was used to bond the pleat molding to the reinforcement frame and they were sealed, thereby forming the flat-type pleat element. The number N of peaks was set to 82 and the pitch P of pleats to 2.9 mm. The ratio M of the pitch P to the thickness T of the humidifying membrane basic material was 1.7.

The pleat element was connected to a housing as shown in FIG. 11 to constitute a humidifying element and a humidifier. The cross-sectional ratio C between a basic portion flow pass and a space portion flow pass was 1.2 on the wet side and 1.3 on the dry side. The ratio V of the wet-side flow pass volume to the dry-side flow pass volume was 1.5. A wire mesh (with a thickness of 3 mm, a wire diameter of 1.5 mm, an opening area ratio of 78%) was placed as a flow pass control means in a space portion on the wet side. The ratio R of the length between an intake port and an exhaust port to the pleat height H was set to 14.0. The humidifier was evaluated under the same conditions as those in Example 1.

Table 1 shows the results.

Table 1 shows the performance of the humidifiers in Examples 1 to 3 and Comparative Example.

All the examples show the low pressure losses, and high humidifying performance per volume, and total performance is excellent in any of the examples.

TABLE 1

|  |  | Example 1 | Example 2 | Example 3 | Comparative Example |
|---|---|---|---|---|---|
| Membrane area | $m^2$ | 1.7 | 1.4 | 2.2 | 1.4 |
| Element volume | L | 4.2 | 2.1 | 4.0 | 2.7 |
| Ratio R |  | 3.6 | 1.5 | 5.8 | 14.0 |
| W/Le |  | 1.7 | 3.3 | 1.0 | 0.5 |
| Dry-side outlet humidity | % RH | 24 | 27 | 25 | 16 |
| Moisture movement | g/min | 180 | 170 | 180 | 120 |
| Moisture movement (per volume) | g/min/L | 42 | 110 | 45 | 43 |
| Exchange capability | g/min/kPa | 6.0 | 5.5 | 6.3 | 4.1 |
| Exchange capability (per volume) | g/min/kPa/L | 1.4 | 2.6 | 1.6 | 1.5 |
| Wet-side pressure loss | kPa | 10 | 8 | 23 | 36 |
| Dry-side pressure loss | kPa | 11 | 3 | 8 | 23 |
| Total performance | $g/min/kPa^2/L$ | 88 | 240 | 51 | 26 |

Example 4

A humidifier identical to that in example 1 was used evaluated under the same conditions except that the evaluation flow rate of the wet air and dry air was changed as in Table 2.

Table 2 shows the results.

As the volume rate of flow is greater, the moisture movement is larger. This means that the efficiency per volume is improved.

TABLE 2

|  |  |  | Example 4 |  |
|---|---|---|---|---|
| Element volume | L |  | 4.2 |  |
| Evaluation flow rate | L/min | 1000 | 2000 | 3000 |
| Volume rate of flow |  | 480 | 960 | 1400 |
| Moisture movement | g/min | 100 | 150 | 180 |
| Moisture movement (per volume) | g/min/L | 24 | 36 | 43 |
| Exchange capability | g/min/kPa | 2.7 | 4.6 | 5.9 |
| Exchange capability (per volume) | g/min/kPa/L | 0.6 | 1.1 | 1.4 |

Example 5

Evaluation was performed under the same conditions as those in Example 1 except that the pleat element width was set to 300 mm and the number N of peaks to 103.

Table 3 shows the results.

The comparison between Example 1 and Example 6 shows that the efficiency per volume was improved by reducing the pleat element volume at a certain flow rate to increase the volume rate of flow.

TABLE 3

|  |  | Example 5 | Example 1 |
|---|---|---|---|
| Element volume | L | 3.2 | 4.2 |
| Ratio R |  | 3.6 | 3.6 |
| Evaluation flow rate | L/min | 3000 | 3000 |
| Volume rate of flow |  | 1900 | 1400 |
| Moisture movement | g/min | 160 | 180 |
| Moisture movement (per volume) | g/min/L | 50 | 43 |
| Exchange capability | g/min/kPa | 5.2 | 5.9 |
| Exchange capability (per volume) | g/min/kPa/L | 1.6 | 1.4 |

INDUSTRIAL AVAILABILITY

The gas separator and its operation method according to the present invention can be used advantageously in terms of cost, volume efficiency, and physical durability for variable applications such as humidification and dehumidification of gas in a solid polymer fuel cell, an air conditioner, and a gas producer for industry.

The invention claimed is:

1. A gas separator comprising:
a pleat element including a pleat molding and a reinforcement frame, the pleat molding being formed by pleating a composite membrane base material formed of a gas separation membrane and at least one layer of breathable reinforcement material, the reinforcement frame being placed on the outer periphery of the pleat molding; and an upper surface and a lower surface of the pleat element being covered with a plate having at least one set of an intake port and an exhaust port;
wherein a ratio (R=L/H) of the shortest length (L) between the intake port and the exhaust port to a height (H) of the pleat element ranges from 0.1 to 7.0, and
wherein an average pitch representing an average distance between adjacent peaks of the pleat molding is defined as (P), a ratio (M) of the average pitch (P) to a thickness (T) of the composite membrane base material is 0.5 to 3.0.

2. The gas separator according to claim 1, wherein the gas separation membrane is a water vapor permeating membrane.

3. The gas separator according to claim 1, wherein the gas separator has a humidifying function.

4. The gas separator according to claim 1, further comprising a pressure absorber between an external pipe and the intake port and the exhaust port.

5. The gas separator according to claim 4, wherein all of intake ports, exhaust ports, and pressure absorbers are integrally formed.

6. The gas separator according to claim 1, wherein the reinforcement frame is formed of a seal material.

7. The gas separator according to claim 1, wherein at least one pleat element is placed in two pressure plates, and the reinforcement frame of each pleat element and the two pressure plates are in close contact with each other to form one hermetic space.

8. A method of operating the gas separator according to claim 1, wherein the gas separator operates at a ratio (a volume rate of flow=NL/Ve) of gas flow rate (NL) per minute to an outer volume (Ve) of the pleat element of 200 or higher.

9. The gas separator according to claim 3, further comprising a pressure absorber between an external pipe and the intake port and the exhaust port.

10. The gas separator according to claim 9, wherein all of intake ports, exhaust ports, and pressure absorbers are integrally formed.

11. The gas separator according to claim 10, wherein the reinforcement frame is formed of a seal material.

12. The gas separator according to claim 11, wherein at least one pleat element is placed in two pressure plates, and the reinforcement frame of each pleat element and the two pressure plates are in close contact with each other to form one hermetic space.

13. A method of operating the gas separator according to claim 12, wherein the gas separator operates at a ratio (a volume rate of flow=NL/Ve) of gas flow rate (NL) per minute to an outer volume (Ve) of the pleat element of 200 or higher.

14. The gas separator according to claim 1, wherein, a ratio (W/Le) of a length (Le) to a width (W) of the pleat element ranges from 0.3 to 10.0.

* * * * *